US010592162B2

United States Patent
Peterson et al.

(10) Patent No.: US 10,592,162 B2
(45) Date of Patent: Mar. 17, 2020

(54) DISTRIBUTED STORAGE LOCATION HINTING FOR NON-VOLATILE MEMORIES

(71) Applicant: Intel Corporation, Santa Clara, CA (US)

(72) Inventors: Scott D. Peterson, Beaverton, OR (US); Sujoy Sen, Beaverton, OH (US); Anjaneya R. Chagam Reddy, Chandler, AZ (US); Murugasamy K. Nachimuthu, Beaverton, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/109,606

(22) Filed: Aug. 22, 2018

(65) Prior Publication Data
US 2019/0042144 A1 Feb. 7, 2019

(51) Int. Cl.
*G06F 3/06* (2006.01)

(52) U.S. Cl.
CPC ............ *G06F 3/0655* (2013.01); *G06F 3/061* (2013.01); *G06F 3/067* (2013.01); *G06F 3/0635* (2013.01); *G06F 3/0679* (2013.01)

(58) Field of Classification Search
CPC .... H04L 45/7453; H04L 45/74; G06F 3/0635
See application file for complete search history.

(56) References Cited

U.S. PATENT DOCUMENTS

| 6,687,240 B1* | 2/2004 | Moertl | G06F 13/4036 370/351 |
| 2013/0031229 A1* | 1/2013 | Shiga et al. | G06F 16/2255 709/223 |
| 2014/0372715 A1* | 12/2014 | Bak | G06F 12/126 711/158 |

(Continued)

OTHER PUBLICATIONS

Dave Minturn, NVM Express Over Fabrics, 11th International Openfabrics Sofware Developer's Workshop, 2015, Intel Corp. (Year: 2015).*

(Continued)

*Primary Examiner* — Midys Rojas
*Assistant Examiner* — Khoda D Doan
(74) *Attorney, Agent, or Firm* — Compass IP Law, PC

(57) ABSTRACT

Examples include methods for obtaining one or more location hints applicable to a range of logical block addresses of a received input/output (I/O) request for a storage subsystem coupled with a host system over a non-volatile memory express over fabric (NVMe-oF) interconnect. The following steps are performed for each logical block address in the I/O request. A most specific location hint of the one or more location hints that matches that logical block address is applied to identify a destination in the storage subsystem for the I/O request. When the most specific location hint is a consistent hash hint, the consistent hash hint is processed. The I/O request is forwarded to the destination and a completion status for the I/O request is returned. When a location hint log page has changed, the location hint log page is processed. When any location hint refers to NVMe- (Continued)

oF qualified names not included in the immediately preceding query by the discovery service, the immediately preceding query is processed again.

20 Claims, 13 Drawing Sheets

(56) References Cited

U.S. PATENT DOCUMENTS

| | | | | |
|---|---|---|---|---|
| 2015/0378605 | A1* | 12/2015 | Huang | H04L 67/1004 711/103 |
| 2016/0127492 | A1* | 5/2016 | Malwankar | H04L 67/2842 709/212 |
| 2018/0095915 | A1* | 4/2018 | Prabhakar | G06F 9/455 |

OTHER PUBLICATIONS

David Karger, Consistent Hashing and Random Trees, 1997, ACM Digital Library (Year: 1997).*

Hai Sun, Yan Sun, Victor C. Valgenti, A highly deterministic hashing scheme using bitmap filter for high speed networking. 2015 International Conference on Computing, Networking and Communications (ICNC), pp. 778-784. IEEE 2015 (Year: 2015).*

* cited by examiner

800

DISTRIBUTED STORAGE LOCATION HINTING FOR NON-VOLATILE MEMORIES

TECHNICAL FIELD

Examples described herein are generally related to block storage systems in a cloud computing data center.

BACKGROUND

Distributed block storage systems provide block device functionality to applications by presenting logical block devices that are stored in segments scattered across a large pool of remote storage devices. To use these logical block devices, applications need to determine the location of all the segments they need to access. Querying a directory service for the segment location before each I/O request greatly increases access latency. Determining them all in advance places unacceptable overhead on the system keeping that location information up to date. Popular large-scale distributed storage systems like Ceph (available at www-.ceph.com) and Gluster (available at docs.gluster.org) use consistent hashing to minimize the cost of determining logical block device segment locations on demand. Unfortunately, these hashing techniques can't be used throughout large scale distributed storage in datacenters. Neither of these are standard storage protocols, and both require specific software in the client device to enable access to this storage. The client device software has a significant runtime and operational cost. These techniques also require the client device using the storage to have access to the storage cluster. Some client devices are untrusted, so that form of access presents an unacceptable security risk.

The problem of performance overhead in the client device is exacerbated when the client device runs on a limited resourced location such as a smart network interface card (NIC) or offloaded device. Data centers can be required to deploy large numbers of gateway machines to enable applications running on client systems to use the distributed block storage service. This adds to latency and inefficient use of network resources because of the extra hops that are required to get to the actual data node.

One approach is to use native distributed storage client devices. Any storage node can run a block device client. Virtual machines (VMs) can be isolated from this via distributed block gateways integrated into the hypervisor. For "bare metal" computing systems or containers there are some kernel implementations, but often a user mode gateway is required. These local gateways are not lightweight and require the cluster administrator to trust the node that runs them.

Another approach is to use dedicated storage gateways. Isolation for untrusted and bare metal applications can be accomplished by using a large number of dedicated gateways (e.g., those using Internet Small Computer Systems Interface (iSCSI)). These appear to the application like a traditional storage array. They must collectively provide high availability, multipath I/O (MPIO), and load balancing just like a traditional storage array. However, this adds one network hop for all storage operations (i.e., initiator to gateway, and gateway to cluster), thereby decreasing system efficiency.

Yet another approach is to use distributed clients in a smart NIC. This includes a storage client like Ceph Reliable Autonomic Distributed Object Store (RADOS) block device (RBD) in the smart NIC and present the RBD volume to the bare metal host, container, or VM as a standard hardware block (e.g., a non-volatile memory express (NVMe) device supporting the Non-Volatile Memory Express (NVMe) Specification, revision 1.3c, published on May 24, 2018 ("NVMe specification") or later revisions). This solves application connectivity issues by using NVMe as a common protocol but requires a complex NIC implementation. NICs with enough processing cores to perform this processing may consume too much of the power and cooling budget of a compute host housing the NIC to an unacceptable degree. The Ceph client code is fairly complex, and best treated as a package that can be updated with the rest of the Ceph cluster. When embedded as a NIC offload, that may become difficult as cluster administrators or tenants can't necessarily be trusted to manage software embedded in the NIC that enforces isolation of tenants from each other and the datacenter management network.

DETAILED DESCRIPTION

Figure 1:
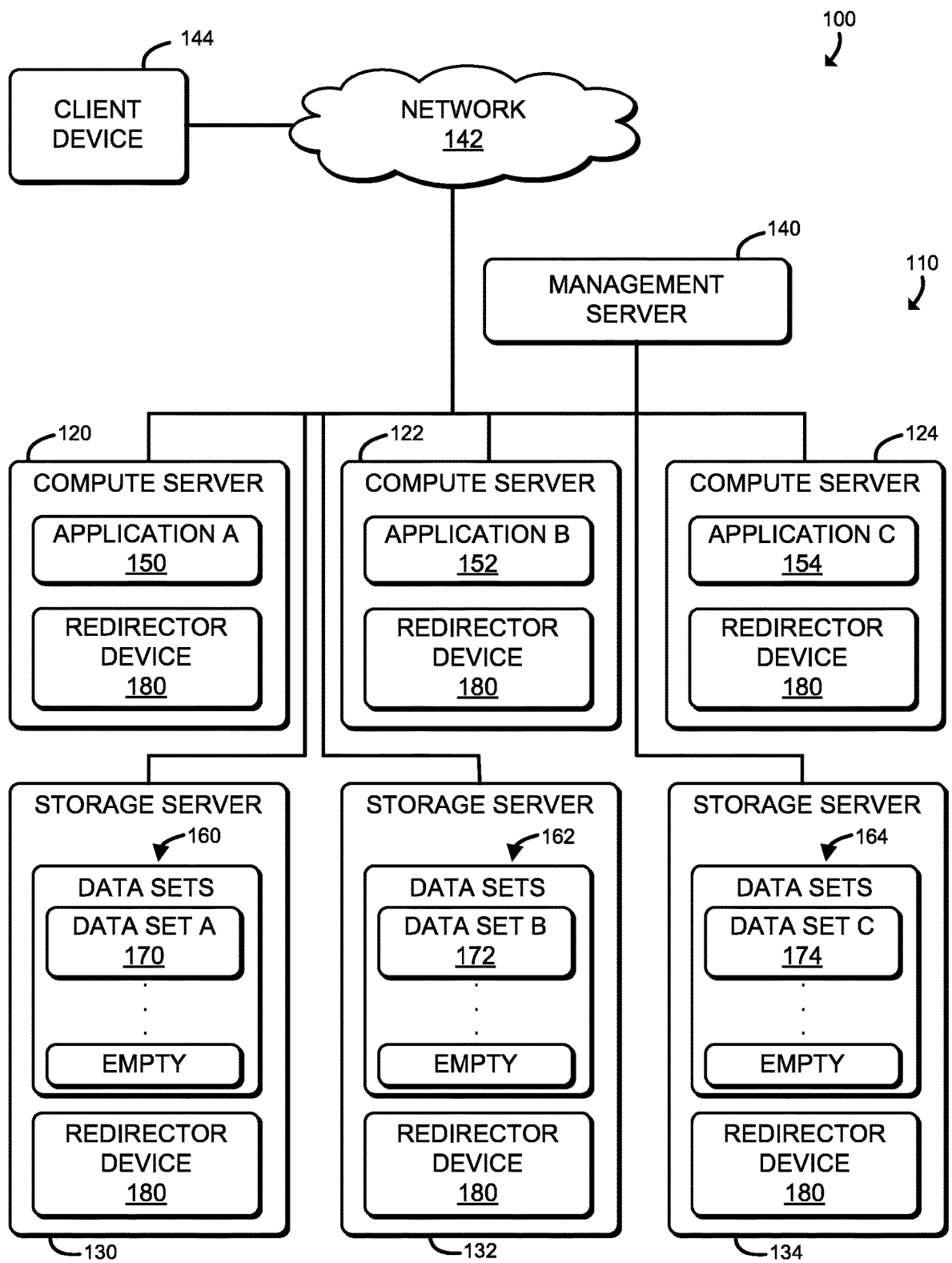
FIG. 1 is a diagram of an embodiment of a system for providing distributed storage location hinting for non-volatile memories.

As contemplated in the present disclosure, embodiments of the present invention comprise implementation of distributed storage location hinting in a computing system supporting NVMe over an interconnect fabric. As used herein, hint is information passed from one part of a distributed storage system to another indicating shorter forwarding paths for IO to parts of logical namespaces. NVMe over an interconnect fabric is described in the NVMe Over Fabric (NVMe-oF) Specification, revision 1.1, published in June 2016 or later revisions (available at nvmexpress.org). Embodiments include changes to NVMe-oF to improve the delivery of location hints. These mechanisms can be used to handle failover of replicated NVMe-oF targets, and striping across multiple NVMe-oF targets.

The hinting mechanism of embodiments of the present invention include consistent hashing compatible with distributed storage systems such as Ceph and Gluster (Ceph and Gluster are referenced herein as examples and in other implementations other distributed storage systems may be used). This consistent hash form of algorithmic location hints allows client devices to determine on their own which storage node should contain each region of the logical block device and to send the I/O request directly to that storage node. The simple form of location hinting mechanism is used to handle the temporary situations where objects in a storage cluster are not yet where they should be.

Embodiments provide logical block devices (consistent with Ceph and Gluster, for example) to be presented as hardware NVMe devices to VMs, containers, or "bare metal" compute nodes with complete isolation from the distributed storage system. A smart NIC runs only a slightly modified NVMe-oF initiator and will require fewer processing cores than a completely embedded RBD client. Without smart NIC support in the compute node, a NVMe-oF initiator (implemented in a Linux™ kernel, for example) can be modified in the same way and provide the same capabilities, and still provide most of the same isolation of the bare metal nodes from the storage cluster.

Storage servers can benefit from a NIC offload technique similar to the one client devices use to shield them from frequently forwarded I/O requests. This can enable unmodified NVMe-oF initiators to access logical volumes without concentrating their gateway workload on a single storage node processor. The addition of the consistent hashing mechanism enables storage initiators to determine the correct location most of the time for a logical block device region. When a logical block device is assembled from tens or hundreds of 1 gigabyte (GB) or larger allocation units by a distributed volume manager (DVM), the cost of sending I/O to a storage node that has to forward it and send back a location hint is seldomly incurred. A distributed storage system (such as Ceph and Gluster, for example), will assemble their logical block devices from many much smaller segments. In embodiments, the locations of where these segments should be can be easily determined. Using the consistent hashing hint approach of embodiments of the present invention, forwarding and hinting will only happen while a region is not located where it should be, and only for initiators that don't have the current location hint.

Referring now to FIG. 1, a system 100 for providing distributed storage location hinting includes a set of compute devices 110 including compute servers 120, 122, 124 and storage servers 130, 132, 134. In the illustrative embodiment, the compute servers 120, 122, 124 and the storage servers 130, 132, 134 are in communication with a management server 140, which, in operation, may assign applications (e.g., processes, sets of operations, etc.) 150, 152, 154 to the compute servers 120, 122, 124 to execute on behalf of a client device 144. During execution, an application (e.g., the application 150) may request access to a data set 160, 162, 164, 170, 172, 174 that is available in one or more copies (e.g., replicas) in one or more of the storage servers 130, 132, 134. In the illustrative embodiment, each compute device 110 includes a redirector device 180, which may be embodied as any device or circuitry (e.g., a coprocessor, an application specific integrated circuit (ASIC), etc.) configured to identify, from a set of routing rules, a target device (e.g., a storage server, another redirector device, etc.), where the request to access a particular data set is to be sent.

Initially, each redirector device 180 may store a set of default routing rules (e.g., provided by the management server 140, a configuration file, or another source) that may not precisely identify the location of each data set and instead, provides general direction as to where requests should be sent. However, over time (e.g., as data access requests are communicated through the system 100) the redirector devices 180 in the system 100 share information (e.g., hints) as to the precise locations of the data sets and thereby reduce the number of hops (e.g., rerouting of data access requests among the redirector devices 180) to enable requests to be sent more directly to the precise locations (e.g., the storage server 130, 132, 134 that actually stores a particular data set). In particular, if a redirector device 180 receives a data access request and determines (e.g., from a set of routing rules utilized by that redirector device 180) that the data access request should be sent to another target device (e.g., a redirector device 180 in a storage server 132 that actually stores the requested data set), the redirector device 180 forwards the request to the other target device (the "downstream target device"). Further, the present redirector device 180 sends the identity of the downstream target device (e.g., the target device to which the request is to be forwarded) upstream to the initiator device (e.g., the device that sent the data access request to the present redirector device 180) for future reference. Furthermore, as data sets are moved between storage servers 130, 132, 134, the redirector devices 180 propagate updates to their routing rules using the scheme described above. As such, by automatically propagating updates to the locations of the data sets among redirector devices 180, the system 100 provides greater reliability over typical distributed storage systems in which changes to the locations of data sets can result in failures to access the data sets.

Figure 2:
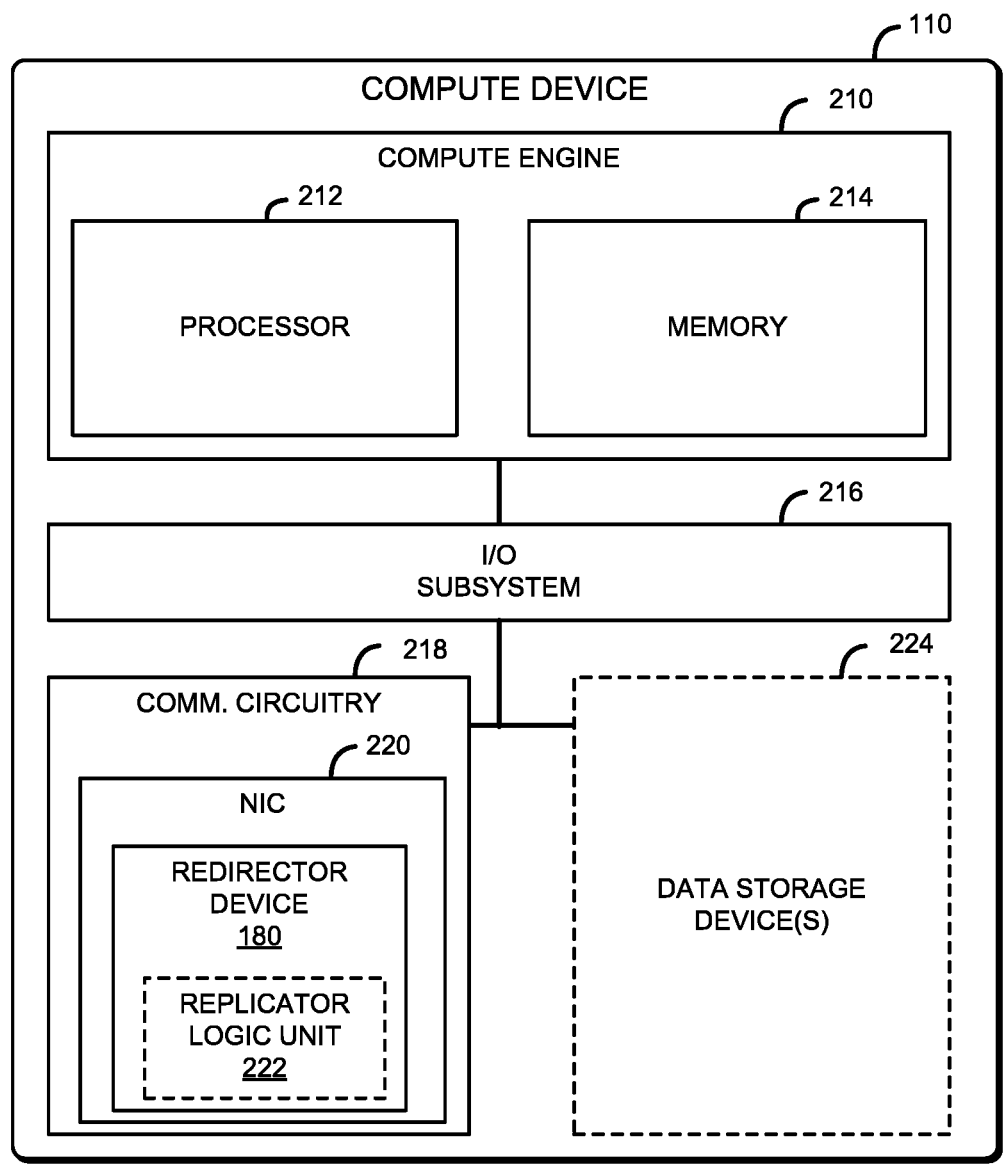
FIG. 2 is a block diagram of an embodiment of a compute device included in the system of FIG. 1.

Referring now to FIG. 2, the illustrative compute device 110 (e.g., a compute server 120, 122, 124, a storage server 130, 132, 134, etc.) includes a compute engine (also referred to herein as "compute engine circuitry") 210, an input/output (I/O) subsystem 216, communication circuitry 218, and may include (e.g., in the case of a storage server) one or more data storage devices 224. Of course, in other embodiments, the compute device 110 may include other or additional components, such as those commonly found in a computer (e.g., a display, peripheral devices, etc.). Additionally, in some embodiments, one or more of the illustrative components may be incorporated in, or otherwise form a portion of, another component. Further, in some embodiments, one or more of the components may be any distance away from another component of the compute device 110 (e.g., distributed across a data center). The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to a field programmable gate array (FPGA), an application specific integrated circuit (ASIC), reconfigurable hardware or hardware circuitry, or other specialized hardware to facilitate performance of the functions described herein.

The main memory 214 may be embodied as any type of volatile (e.g., dynamic random-access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random-access memory (DRAM) or static random-access memory (SRAM). One particular type of DRAM that may be used in a memory module is synchronous dynamic random-access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three-dimensional cross-point memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D cross-point memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as applications, data operated on by the applications, routing rules, libraries, and drivers.

The compute engine 210 is communicatively coupled to other components of the compute device 110 via the I/O subsystem 216, which may be embodied as circuitry and/or components to facilitate input/output operations with compute engine 210 (e.g., with processor 212 and/or main memory 214) and other components of compute device 110. For example, I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, I/O subsystem 216 may form a portion of a system-on-a-chip (SoC) and be incorporated, along with one or more of processor 212, main memory 214, and other components of the compute device 110, into compute engine 210. In some embodiments, I/O subsystem 216 supports a NVMe over fabric protocol.

The communication circuitry 218 may be embodied as any communication circuit, device, or collection thereof, capable of enabling communications over network 142 between compute device 110 and another compute device (e.g., a compute server 120, 122, 124, a storage server 130, 132, 134, management server 140, client device 144, such as to provide a fast path between client device 144 and redirector device 180, etc.). The communication circuitry 218 may be configured to use any one or more communication technology (e.g., wired or wireless communications) and associated protocols (e.g., Ethernet, Bluetooth®, Wi-Fi®, WiMAX, etc.) to implement such communication.

The illustrative communication circuitry 218 includes a network interface controller (NIC) 220, which may also be referred to as a host fabric interface (HFI). NIC 220 may be embodied as one or more add-in-boards, daughter cards, network interface cards, controller chips, chipsets, or other devices that may be used by compute device 110 to connect with another compute device (e.g., a compute server 120, 122, 124, a storage server 130, 132, 134, management server 140, client device 144, etc.). In some embodiments, NIC 220 may be embodied as part of a system-on-a-chip (SoC) that includes one or more processors or included on a multichip package that also contains one or more processors. In some embodiments, NIC 220 may include a local processor (not shown) and/or a local memory (not shown) that are both local to NIC 220. In such embodiments, the local processor of NIC 220 may be capable of performing one or more of the functions of compute engine 210 described herein. Additionally, or alternatively, in such embodiments, the local memory of NIC 220 may be integrated into one or more components of compute device 110 at the board level, socket level, chip level, and/or other levels. In the illustrative embodiment, NIC 220 includes the redirector device 180 described above with reference to FIG. 1. Further, redirector device 180 may include a replicator logic unit 222, which may be embodied as any device or circuitry (e.g., a co-processor, an FPGA, an ASIC, etc.) configured to manage the replication (e.g., copying) of data sets among multiple data storage devices 224 (e.g., across multiple storage servers 130, 132, 134), including forwarding write requests to multiple downstream target devices (e.g., to other storage servers), detecting overlapping write requests (e.g., requests to write to the same logical block address (LBA)), coordinating application writes with replica resilvering, and ensuring that overlapping writes are performed to all replicas in the same order (resolving the overlap condition the same way everywhere). Resilvering is the action of making the contents of a replica of a storage device consistent with the device it replicates. That could be a new replica device, or one that somehow became inconsistent (e.g. because it was disconnected for a period of time). In some embodiments of system 100, one or more of redirectors devices 180 may be a standalone device (e.g., located between compute devices 110 rather than incorporated into a compute device 110).

The one or more illustrative data storage devices 224 may be embodied as any type of devices configured for short-term or long-term storage of data such as, for example, memory devices and circuits, memory cards, hard disk drives, solid-state drives, or other data storage devices. Each data storage device 224 may include a system partition that stores data and firmware code for the data storage device 224. Each data storage device 224 may also include one or more operating system partitions that store data files and executables for operating systems. In embodiments in which the compute device 110 is a storage server 130, 132, 134, the data storage devices 224 store one or more of the data sets 160, 162, 164.

According to some examples, data storage devices 224 are composed of one or more memory devices or dies which may include various types of volatile and/or non-volatile memory. Volatile types of memory include, but are not limited to, dynamic random-access memory (DRAM), static random-access memory (SRAM), thyristor RAM (TRAM) or zero-capacitor RAM (ZRAM). Non-volatile types of memory include byte or block addressable types of non-volatile memory having a 3-dimensional (3-D) cross-point memory structure that includes chalcogenide phase change material (e.g., chalcogenide glass) hereinafter referred to as "3-D cross-point memory" (such as 3D XPoint™ commercially available from Intel Corporation). Non-volatile types of memory also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. Data storage devices 224 comply with the Non-Volatile Memory Express (NVMe) Specification, revision 1.3c, published on May 24, 2018 ("NVMe specification") or later revisions, and/or the NVMe over Fabric (NVMe-oF) Specification, revision 1.1, published in June 2016 or later revisions (available at nvmexpress.org).

The management server 140 and the client device 144 may have components similar to those described in FIG. 2 with reference to the compute device 110. The description of those components of the compute device 110 is equally applicable to the description of components of the management server 140 and the client device 144, with the exception that, in some embodiments, the redirector device 180 and the replicator logic unit 222 is not included in the communication circuitry of the management server 140 and/or the client device 144. Further, it should be appreciated that any of the compute devices 110, the management server 140, and the client device 144 may include other components, sub-components, and devices commonly found in a computing device, which are not discussed above in reference to the compute device 110 and not discussed herein for clarity of the description.

As described above, the compute servers 120, 122, 124, the storage servers 130, 132, 134, the management server 140, and the client device 144 are illustratively in communication via the network 142, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), a radio area network (RAN), digital subscriber line (DSL) networks, cable networks (e.g., coaxial networks, fiber networks, etc.), or any combination thereof.

In some examples, compute device 110, includes, but is not limited to, a server, a server array or server farm, a web server, a network server, an Internet server, a disaggregated server, a work station, a mini-computer, a main frame computer, a supercomputer, a network appliance, a web appliance, a distributed computing system, multiprocessor systems, processor-based systems, or a combination thereof.

Figure 3:
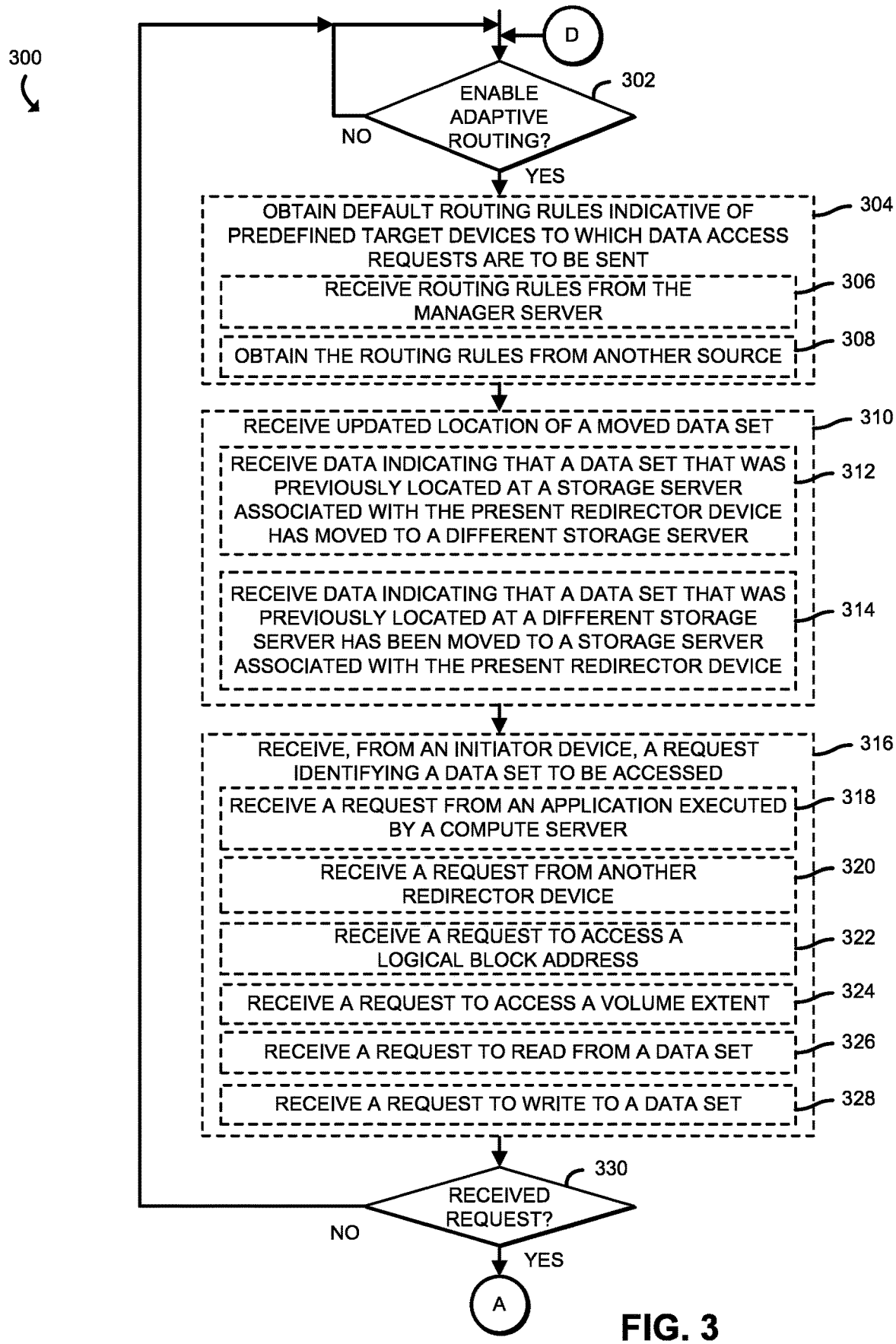
FIGS. 3-5 are flow diagrams of an embodiment of a method for providing distributed storage location hinting that may be performed with a redirector device of a compute device of FIGS. 1 and 2.

Referring now to FIG. 3, a redirector device 180, in operation, may execute, a method 300 for providing adaptive data access request routing. The method 300 begins with block 302, in which redirector device 180 determines whether to enable adaptive routing of data access requests. In the illustrative embodiment, redirector device 180 may determine to enable adaptive routing in response to performing a self-diagnostic and determining that the self-diagnostic has not detected any errors, in response to determining that other redirector devices 180 are present in the system 100, and/or based on other factors. Regardless, in response to a determination to enable adaptive routing, method 300 advances to block 304 in which redirector device 180 may obtain default routing rules indicative of predefined target devices to which data access requests are to be sent. In doing so, and as indicated in block 306, redirector device 180 may receive the routing rules from management server 140 (e.g., through the network 142). Alternatively, and as indicated in block 308, redirector device 180 may obtain the routing rules from another source, such as from a configuration file (e.g., present in a data storage device 224 or in memory 214).

Subsequently, in block 310, redirector device 180 may receive data (e.g., routing rules) indicative of an updated location of a data set that has been moved. In doing so, and as indicated in block 312, redirector device 180 may receive data indicating that a data set that was previously located at a storage server (e.g., storage server 130) associated with the present redirector device 180 (e.g., the redirector device 180 used to perform the method 300 is a component of the storage server 130) has moved to a different storage server (e.g., storage server 132). Alternatively, as indicated in block 314, redirector device 180 may receive data indicating that a data set that was previously located at a different storage server 134 has been moved to a storage server (e.g., storage server 130) associated with the present redirector device 180 (e.g., the redirector device 180 performing method 300 is a component of storage server 130).

As indicated in block 316, redirector device 180 receives, from an initiator device, a request that identifies a data set to be accessed. In doing so, and as indicated in block 318, redirector device 180 may receive the request from an application executed by a compute server (e.g., from the compute engine 210) executing an application (e.g., application 150). As indicated in block 320, redirector device 180 may receive the request from another redirector device 180 (e.g., a redirector device included in another compute device 110). Additionally, as indicated in block 322, in receiving the request, redirector device 180 may receive a request to access a specified logical block address (LBA). As indicated in block 324, the request may be to access an extent (e.g., a defined section) of a volume. The request may be a request to read from a data set, as indicated in block 326, or to write to a data set, as indicated in block 328. In block 330, redirector device 180 determines the subsequent course of action as a function of whether a request was received in block 316. If no request was received, method 300 loops back to block 302, in which redirector device 180 determines whether to continue to enable adaptive routing. Otherwise (e.g., if a request was received), method 300 advances to block 332 of FIG. 4, in which redirector device 180 determines whether the requested data set is available at a storage server associated with the present redirector device 180 (e.g., whether redirector device 180 is a component of storage server 130 on which the requested data set is stored).

Figure 4:
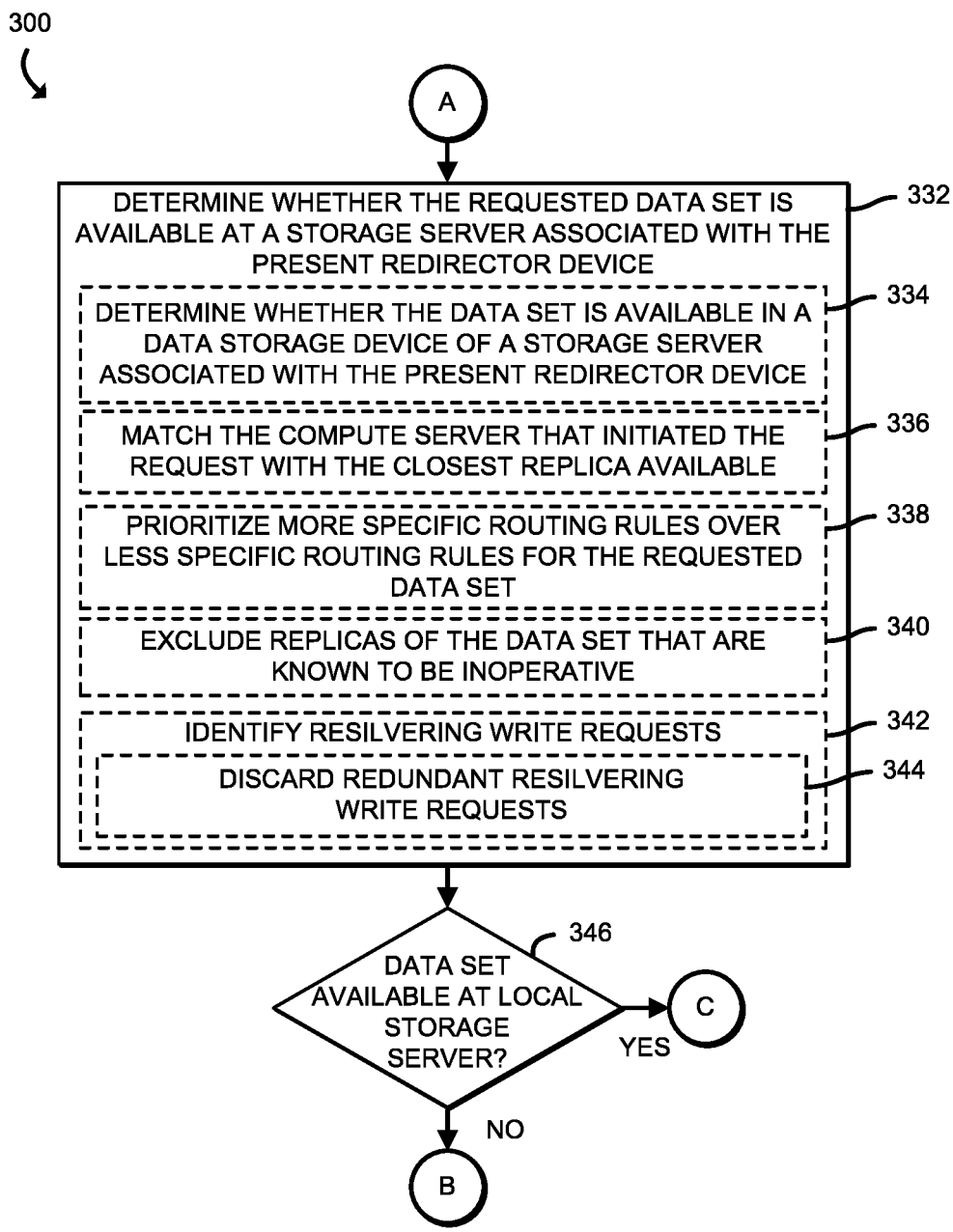

Referring now to FIG. 4, as indicated in block 334, redirector device 180 in determining whether the requested data set is available on storage server 130, determines whether the data set is available in a data storage device 224 of storage server 130. Further, in determining whether the requested data set is available at a storage server associated with the present redirector device 180, redirector device 180 may additionally match an identity of compute server 120 that initiated the request (e.g., a read request) with a replica of the data set that is closest (e.g., in the same physical rack rather than in another rack of the data center) to compute server 120, as indicated in block 336. If redirector device 180 is not associated with (e.g., not a component of) the storage server having the closest replica of the data set for compute server 120 that initiated the request, redirector device 180 may determine that the requested data set is not available at the present storage server 130, even if the data set actually is stored in the present storage server 130.

As indicated in block 338, redirector device 180 may prioritize more specific routing rules over less specific routing rules for the requested data set. For example, the routing rules may include one rule that indicates that requests associated with a particular range of logical block addresses or requests associated with a particular volume should generally be routed to redirector device 180 in storage server 132, while another routing rule specifies that requests to access a specific logical block address within that broader range, or a particular extent of the volume, should be sent to storage server 134. In the above scenario, redirector device 180 selects the second routing rule, as it is more specific and will provide a more direct route to the actual location of the requested data set. As indicated in block 340, redirector device 180, in the illustrative embodiment, excludes from the selection of a target device (e.g., a storage server 130, 132, 134), any target device having a replica that is known to be inoperative (e.g., data storage device 224 on which the replica is stored is malfunctioning). The redirector device 180 may receive data regarding the operational status of an inoperative replica from storage server 130, 132, 134 on which the replica is hosted (e.g., stored), from management server 140, or from another source (e.g., from another redirector device 180).

As indicated in block 342, redirector device 180 may identify resilvering write requests (e.g., requests to write data to a replica that in the process of being created). In doing so, and as indicated in block 344, redirector device 180 discards any redundant resilvering write requests (e.g., requests to write to the same logical block address). Subsequently, in block 346, redirector device 180 determines the subsequent course of action based on whether the requested data set has been determined to be available at a local storage server (e.g., a storage server 130 that redirector device 180 is a component of). If not, method 300 advances to block 348 of FIG. 5, in which redirector device 180 forwards the data access request to a downstream redirector device 180. Otherwise, method 300 advances to block 360 of FIG. 5, in which the redirector device 180 accesses the requested data set in the storage server associated with the present redirector device 180.

Figure 5:
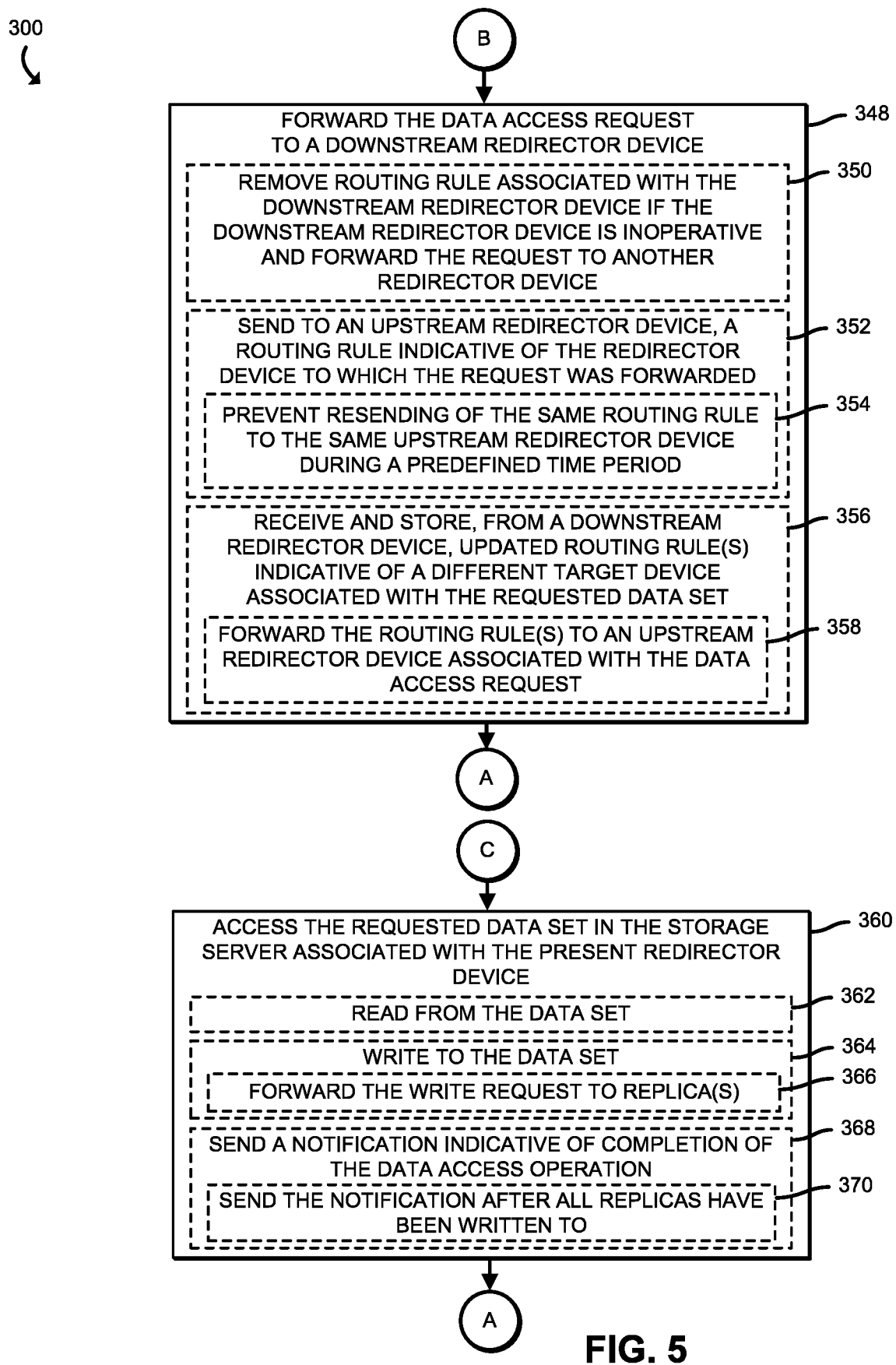

Referring now to FIG. 5, in forwarding the data access request to a downstream redirector device 180, the present redirector device 180 may remove (e.g., delete) a routing rule associated with a downstream redirector device 180 if that downstream redirector device 180 is inoperative (e.g., unresponsive) and forward the data access request to another redirector device 180, as indicated in block 350. As indicated in block 352, redirector device 180 may send, to an upstream redirector device 180 (e.g., a redirector device 180 that sent the request to the present redirector device 180), a routing rule indicative of the downstream redirector device 180 to which the request was forwarded. In doing so, however, redirector device 180 may suppress (e.g., prevent the resending of) a routing rule that was previously sent to the same upstream redirector device within a predefined time period (e.g., within the last 5 minutes), as indicated in block 354. As indicated in block 356, redirector device 180 may receive and store, from a downstream redirector device 180, one or more updated routing rules indicative of a different target device associated with the requested data set (e.g., a different storage server 130, 132, 134 or redirector device 180 to which data access requests associated with the data set should be sent in the future). Further, and as indicated in block 358, redirector device 180, in the illustrative embodiment, may forward the routing rule(s) to an upstream redirector device 180 associated with the data access request (e.g., that sent the data access request to the present redirector device 180). Subsequently, method 300 loops back to block 302 of FIG. 3, in which redirector device 180 determines whether to continue to enable adaptive routing of data access requests.

Still referring to FIG. 5, if method 300 instead advanced to block 360 in which redirector device 180 accesses the requested data set in storage server 130 associated with the present redirector device 180, redirector device 180 may read from the data set, as indicated in block 362, or may write to the data set, as indicated in block 364. In writing to the data set, redirector device 180 may forward the write requests to one or more other storage servers (e.g., through one or more redirector devices 180) to write the same data to corresponding replicas hosted on those storage servers. As indicated in block 368, redirector device 180 may send a notification (e.g., to an upstream device) indicating completion of the data access operation (e.g., read or write). In the case of a write, and as indicated in block 370, redirector device 180 waits until all replicas have successfully been written to before sending the notification of completion. Subsequently, method 300 loops back to block 302 of FIG. 3, in which redirector device 180 determines whether to continue to enable adaptive routing of data access requests.

FIGS. 3-4 have described a redirector in terms that could apply to any storage protocol. The following description discloses a redirector for storage devices supporting NVMe-oF. Recall that a redirector accepts block I/O requests for a logical block device and completes them to one of a number of alternative block devices according to an internal table (also known as a mapper). The destination for some I/O requests may be local storage devices. If an I/O request falls within a region the mapper determines to be remote, the redirector forwards the I/O request there and also sends a location hint back to the originator of the I/O request. A location hint is a message that identifies a range of blocks in a specific logical block device, and the address of a network storage device that is a "better" destination for that I/O request than the redirector sending the hint. The originator should retain that location hint and send subsequent I/O requests for that region of the storage device to that destination directly.

There are at least five use cases for this system that may be used to establish the terminology and how these fit into the existing NVMe-oF framework. A first use case is the trivial case. A second case is the simplest case where location hints would be necessary, and the general form of a simple location hint. A third case illustrates simple location hints which can be used to fluidly allocate space from a pool of available remote storage, and how a system of default targets might be constructed. A fourth use case illustrates striping and a location hint that enables a host to map logical block addresses (LBAs) to one of several destinations based on a function. Finally, a fifth use case illustrates a consistent hashing location hint which can allow a host to determine the correct destination for any block I/O request on its own most of the time.

Embodiments of the present invention described herein remains compatible with unmodified NVMe-oF hosts and subsystems. That is, hosts (e.g., computer servers 120, 122, 124) extended as described herein can also simultaneously connect to standard and extended NVMe-oF subsystems. An unmodified NVMe-oF host can access distributed storage through an extended NVMe-oF subsystem; but with lower performance than an extended host.

In one embodiment using a Linux™ Volume Manager (LVM) model, logical NVMe namespaces (LNs) are mapped to physical NVMe namespaces (PNs) from a pool that spans many storage nodes. A PN can be any storage device with an NVMe or NVMe-oF interface. An actual physical NVMe namespace is just the simplest case.

As with the LVM, the PNs can be divided into extents of some convenient size, and LNs can be mapped to a collection of PN extents to produce a LN of the desired size from available unallocated extents of PNs. Only LNs are exposed to hosts as their provisioned block devices.

A convention is established wherein each LN is valid in every storage subsystem (e.g., storage servers 130, 132, 134) providing extents of PNs for it. This implies multiple storage subsystems will expose the same namespace, with the same namespace globally unique identifier (NSGUID)/EUI64, as defined in the NVMe-oF specification. It's unclear whether exposing the same namespace unique identifier from multiple subsystems will always be acceptable, so the mapping mechanisms described herein will accommodate translating to distinct namespace identifiers at each step. In these cases, one can assume there's always a shorter form of the mapping structure that omits the namespace translation.

The simple use cases for storage location hinting posit the existence of a distributed volume manager (DVM) that persists the mapping of LNs to PNs or PN extents, can add or remove entries from the mappers of the redirectors at the PNs, and the initial hints given to hosts. Such systems use only simple location hints. Here a "simple location hint" means a message identifying an extent (i.e., range of LBAs) of the LN, and a destination for that I/O request. That must include at least the storage subsystem NVMe qualified name (NQN) and may also contain an NSGUID (of another namespace), and an optional offset. A simple location hint may also specify whether it applies to reads, writes, or both.

Embodiments also describe "algorithmic location hints" which will specify multiple destinations and identify a function for mapping the LN LBA to one of the destinations.

Figure 6:
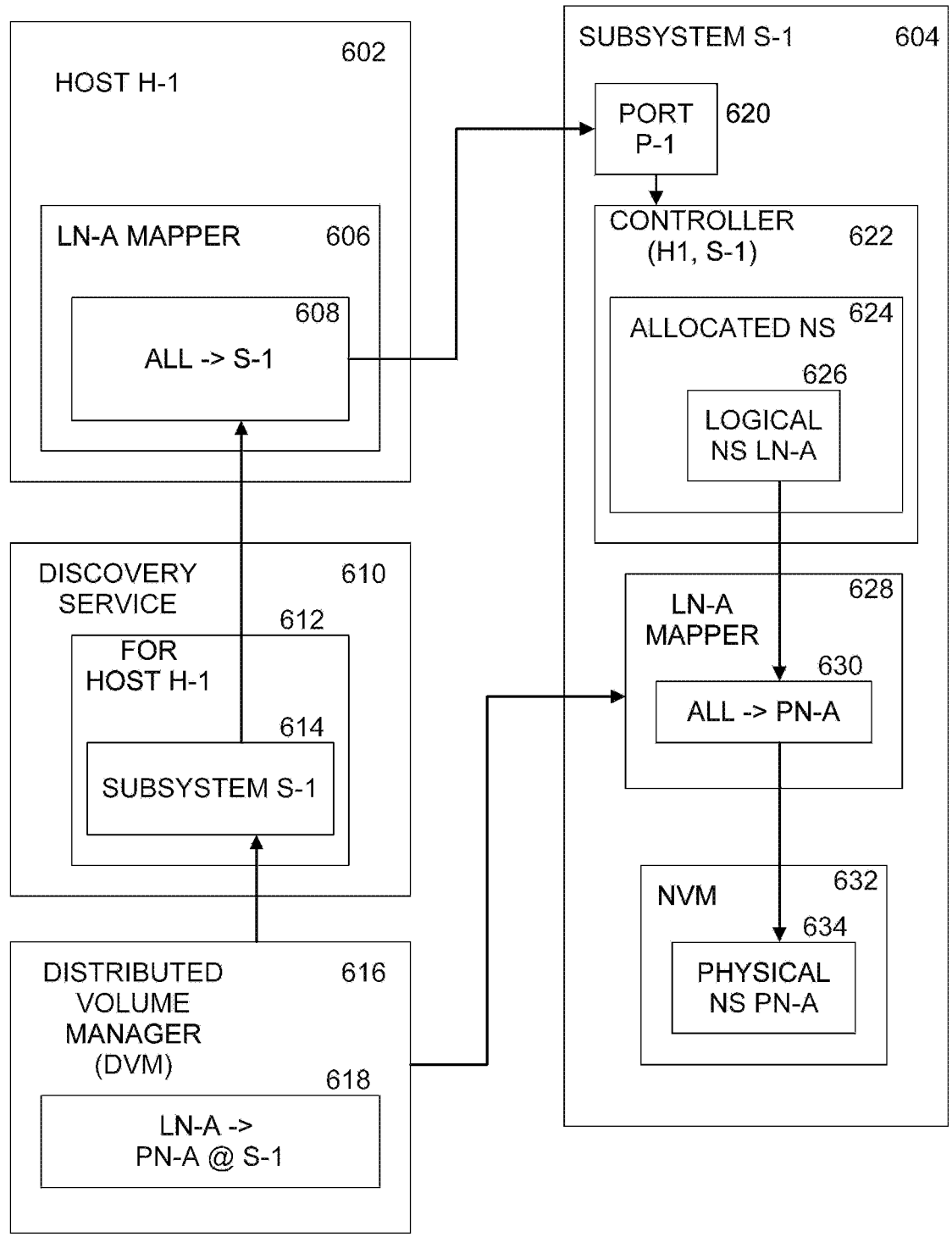
FIG. 6 is a diagram of a logical namespace mapped to a single physical namespace according to an embodiment.

In a first use case, a logical namespace (LN) maps to single physical namespace (PN). FIG. 6 is a diagram 600 of a logical namespace mapped to a single physical namespace according to an embodiment. In this use case, host H-1 602 accesses a logical NVMe namespace, denoted LN-A, which is persisted in a single physical NVMe namespace, denoted PN-A, via port P-1 620 of storage subsystem S-1 604. In an embodiment, host H-1 602 is one of the computer servers 120, 122, 124, subsystem S-1 is one of the storage servers 130, 132, 134, and NVM 632 is one of data storage devices 224. NVM 632 includes physical network storage addresses PN-A 634.

This is the trivial use case. This example does not demonstrate location hints, but demonstrates the relationship of the LN, PN, and other required entities in a complete system. The PN is not divided into extents to simplify the example. Compared to standard NVMe-oF, this example provides isolation of the LN-A NSGUID from the NSGUID of the physical NVMe device namespace used. A user might do this to facilitate migrating LN-A to a more complex mapping scheme later without changing its ID. Some existing NVMe-oF targets may provide similar capabilities.

The user in client device 144 configures subsystem S-1 604 to be managed by distributed volume manager (DVM) 616, and the DVM knows which resources (such as ports, existing namespaces, unallocated NVM, etc.) in subsystem S-1 604 the DVM can use (shown as LN-A→PN-A @ S-1 component 618). The user configures the DVM to create logical addresses LN-A, with NSGUID G-A to be backed by physical addresses PN-A (possibly creating PN-A) in subsystem S-1. Here the DVM creates LN-A, so must also create an identifier for it. G-A is the NSGUID (namespace global identifier) for logical namespace LN-A. That is, causing the NVM (632) to create a new namespace, which becomes PN-A. It's more likely the NVM will have a single namespace and not support creating/deleting any.

DVM 616 populates a LN-A mapper component 628 in subsystem S-1 604 to map all incoming I/O requests for LN-A to local network storage (NS) PN-A (as shown by component 630). The DVM configures a Discovery Service (DS) component 610 to recognize host H-1 602 and add subsystem S-1 614 to the list of subsystems 612 Host H-1 can access. Host H-1 602 is configured to use (only) the DS 610 managed by DVM 616, and to use the network storage with NSGUID G-A.

NVMe-oF discovery services provide lists of NVMe-oF subsystems to the hosts that connect to them and make that query. This reveals information the host needs to establish those connections (addresses, ports, keys, etc.). The discovery service query response identifies only subsystems, not the namespaces they may contain. Discovery services are free to recognize the hosts that connect to them and return different subsystem lists to different hosts. This is performed here so H-1 will only be told about the subsystems necessary to access LN-A, which in this example is the only LN that H-1 will have access to. NVMe-oF subsystems will return lists of namespaces they contain to connected hosts in response to standard NVMe-oF commands. Subsystems may not expose all namespaces to all hosts. In this instance, it is assumed that H-1 will only discover LN-A on S-1. PN-A, or LN-B (if that exists) would not be available to H-1.

Host H-1 602 starts, queries the DS 610, and gets the connection info for subsystem S-1 614. Host H-1 602 gets connected to controller component 622 in subsystem S-1 604. This requirement is from NVMe or NVMe-oF. A namespace may have a state of "Allocated." When hosts connect to controllers, the hosts enumerate the controllers and connect to one or all of them in the process of bringing up their local block devices. This is the same LN-A mentioned above. Because this subsystem is a redirector, and part of the distributed system managed by DVM 616, the subsystem exposes LN-A to at least H-1.

Through a series of Identify commands host H-1 602 enumerates the namespaces host H-1 can see in subsystem S-1 604. One of these should have NSGUID G-A (i.e., The NSGUID of LN-A). Host H-1 602 updates the host's mapper component for LN-A 606 to have subsystem S-1 as a default target (as shown in ALL→S-1 component 608). All I/O requests in host H-1 602 for LN-A are then sent to subsystem S-1 604.

Figure 7:
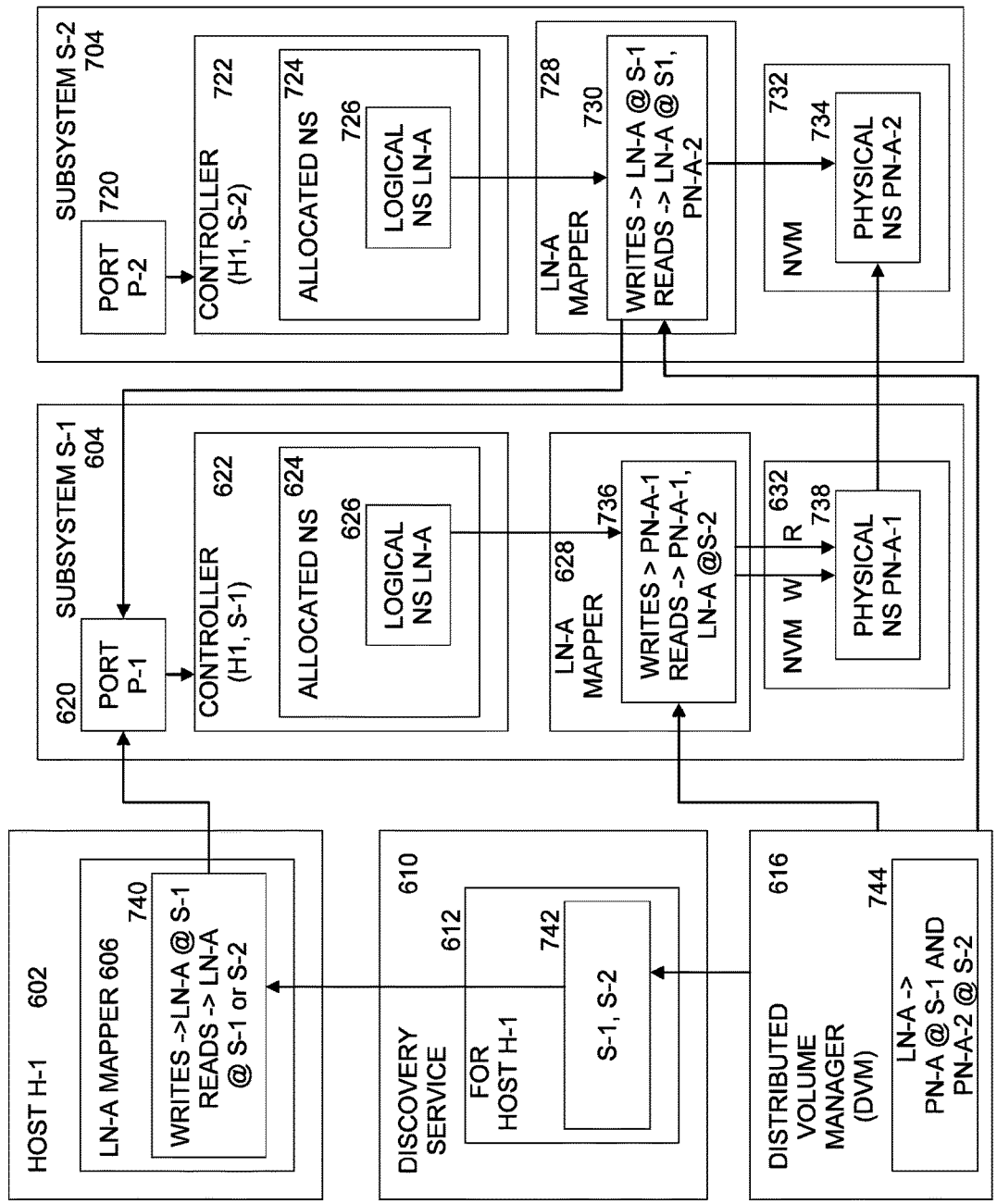
FIG. 7 is a diagram of a logical namespace mapped to a replicated pair of physical namespaces according to an embodiment.

In a second use case, a logical namespace (LN) maps to a replicated pair of physical namespaces (PNs). FIG. 7 is a diagram of a logical namespace mapped to a replicated pair of physical namespaces according to an embodiment. Host H-1 602 accesses LN-A, which is persisted redundantly in PN-A-1 738 via port P-1 620 of subsystem S-1 604, and PN-A-2 734 via port P-2 720 of subsystem S-2 704.

Here we assume subsystem S-1 604 and subsystem S-2 704 each contain NVMs 632, 732 that can replicate network storage (NS) to each other and can detect when an NVM fails. DVM 616 configures these NVMs 632, 732 to replicate the mirrored NS in one direction, monitor the NVM for failures, and take failover action if that happens. This example demonstrates the use of the simplest form of location hint.

In this example, DVM 616 chooses storage subsystem S-1 604 as the master, and storage subsystem S-2 704 as the replica for LN-A. The DVM populates LN-A mapper 628 in subsystem S-1 to map 736 all writes for LN-A to PN-A-1 738, and all reads to either LN-A-1 or LN-A in subsystem S-2. The DVM populates the LN-A mapper 728 in subsystem S-2 704 to direct 730 all writes to LN-A to LN-A in subsystem S-1, and all reads to LN-A to PN-A-2 or LN-A in subsystem S-1.

The DVM configures the Discovery Service (DS) 610 used by host H-1 602 to return subsystem S-1 604 and subsystem S-2 704 as the list of subsystems host H-1 can access. Host H-1 602 starts and queries DS 610 as in the first use case above. Host H-1 does not yet know whether LN-A is a logical or physical NVMe-oF name space. Host H-1 connects to all of the subsystems returned by the DS (e.g., subsystems S-1 and S-2 in this example). Both subsystems S-1 and S-2 expose LN-A, so host H-1 will initially populate LN-A mapper component 606 with both of these as alternative default targets. Host H-1 is now able to send I/O requests for LN-A to either subsystem S-1 or subsystem S-2. Any read or write host H-1 602 sends to subsystem S-1 604 now would be completed locally by subsystem S-1. Any read host H-1 602 sends to subsystem S-2 704 would be completed locally by subsystem S-2. Any write sent to subsystem S-2 would be forwarded to subsystem S-1 by subsystem S-2.

Controller is an NVMe entity. It's the first thing a host contacts when connecting to an NVMe namespace, whether it's local or NVMe-oF. The allocated and logical namespaces (624, 724, 626, 726) are the same as in FIG. 6. LN-A is an "allocated" namespace in S-1 and S-2, because they are components in the system managed by DVM 616, and provide all the PN's that contain LN-A.

If host H-1 directly uses any NVMe-oF PNs, some of the subsystems returned by DS 610 will be normal NVMe-oF targets that will not be exposing LN-A.

When subsystems S-1 604 and S-2 704 discover host H-1 602 is a redirector and is using LN-A, they send default location hints for LN-A. In this case subsystems S-1 and S-2 send the same hints directing writes to just subsystem S-1 and reads to either subsystem S-1 or subsystem S-2. Host H-1 will update LN-A mapper 606 accordingly. Host H-1 now has a single destination for all writes, and two choices for reads. It's up to Host H-1 602 which one it will choose, or whether it will round-robin between alternatives to spread the load.

In an embodiment, the contents of the location hints are described in the example of Table 1. All of the location hints in this example refer to an entire logical namespace. Two hints will be required to specify different sets of alternative locations for reads and writes. A single hint could be used if all I/O (read or write) from host H-1 was directed to subsystem S-1, for example.

TABLE 1

| Field | | Description |
|---|---|---|
| LN Start LBA | | '0' in both for "all LBAs" |
| LN End LBA | | |
| I/O direction | | R, W, or both |
| Multiple location policy | | One of: |
| | | "Order indicates preference", |
| | | "client RR", |
| | | "client chooses" |
| Locations | | If >1 location supplied, apply |
| | | multiple location policy above |
| Location 1 | Subsystem NQN | One of the subsystems identified by the DS |
| | Destination NSGUID | The same as the LN NSGUID |
| | Offset | The same as 'Start LBA' |
| | Locations 2-n | Repeats for as many locations as there are |

At this point I/O requests from host H-1 will flow to subsystem S-1 or subsystem S-2 as above until something changes. If the NVM 632 in subsystem S-1 604 fails, or subsystem S-1 needs to be shut down, the DVM 616 will update mappers 628, 728 in subsystems S-1 and S-2 to direct all reads and writes to subsystem S-2 704. This may produce a spontaneous location hint update from subsystem S-1 and subsystem S-2 to all hosts associated with LN-A. All subsequent I/O requests to subsystem S-1 will be forwarded to subsystem S-2 and produce a location hint directing them to subsystem S-2.

If the connection from host H-1 to subsystem S-1 fails, host H-1 will direct all I/O requests to subsystem S-2 while host H-1 attempts to reestablish its connection to subsystem S-1. If the connection from subsystem S-2 to S-1 is still up, subsystem S-2 will forward write requests. When subsystem S-1 comes back online, and the DVM has resilvered the LN-A replica to S-1, the DVM may update the mappers 628, 728 in subsystems S-1 604 and S-2 704 to direct writes back to subsystem S-1 again.

The decision of where host H-1 should send reads could have been made by the DVM in a number of ways. The DVM could have populated the mappers in subsystems S-1 and S-2 to direct reads only to subsystem S-1 (or subsystem S-2). The order in which multiple alternative destinations for the same I/O request appear can be considered their preference. In that case, host H-1 would send reads to whichever subsystem appeared first in the list contained in the hint.

In an embodiment, the LN-A mappers 628, 728 in subsystems S-1 and S-2 may be extended to consider the NVMe Qualified Name (NQN) of the host when sending the initial set of hints. DVM 616 would configure such a mapper with a different alternative target ordering for each expected host NQN (e.g., ones favoring the LN replicas closest to each host on the fabric). This host NQN information would not be carried in the location hint itself, so a redirector that forwarded this hint (as opposed to being configured with it by the DVM) would not be able to make that same host NQN alternative decision. If used in the redirectors collocated with the PNs and matching only NQNs of hosts (not the redirectors in other storage sleds), this mechanism would redirect reads from hosts to their nearest replica once they received hints locating the PNs and send reads there directly.

This example sends all writes to a single subsystem for replication. Alternatively, the NVM could be split into extents with half replicating in each direction (e.g. odd extents replicate subsystem S-1 to subsystem S-2, and even extents go the opposite way). The initial hints would be updated to match. The result would be that writes were balanced between subsystems S-1 and S-2 as long as both were operational.

Figure 8:
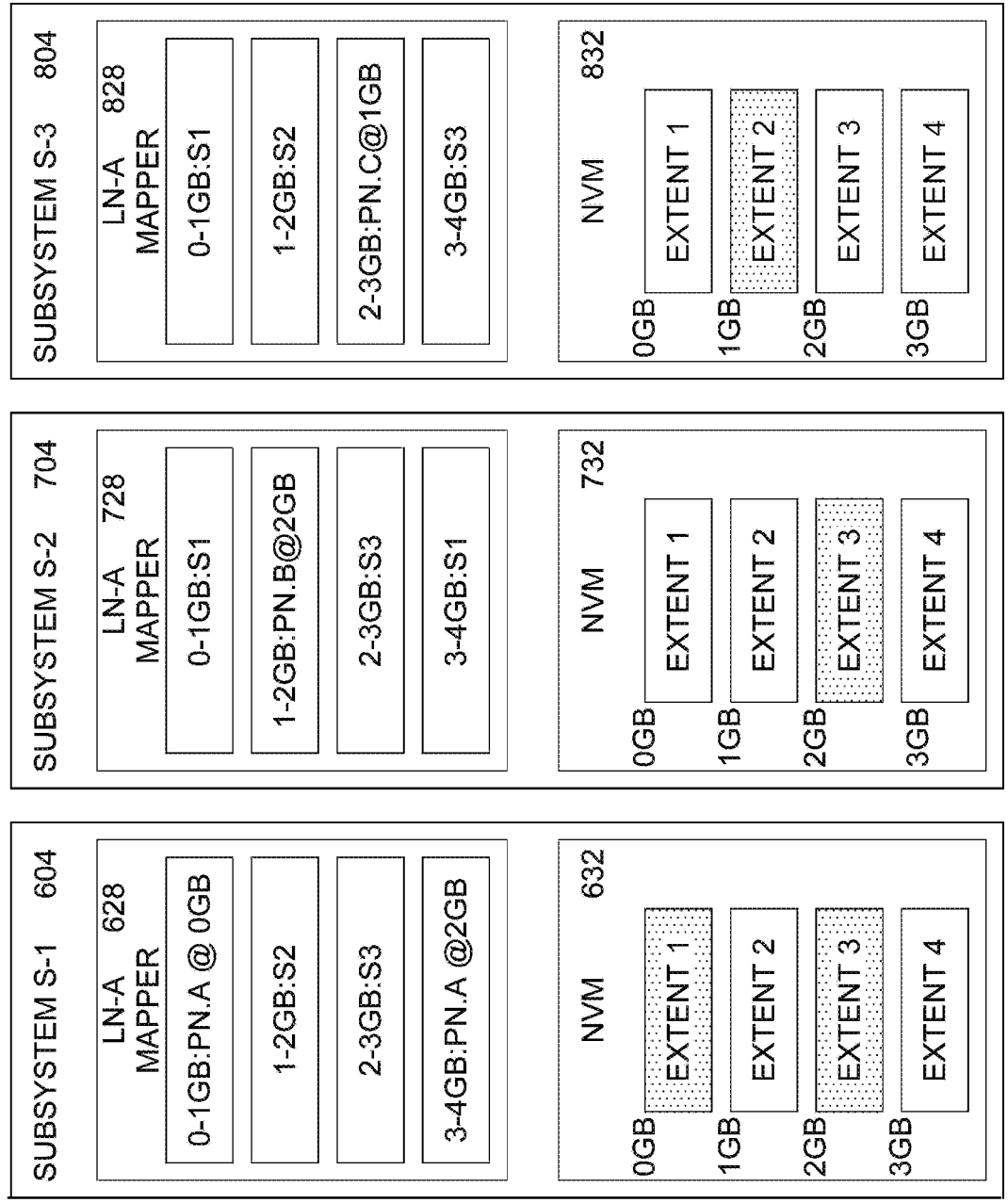
FIG. 8 is a diagram of a logical namespace assembled from concatenated extents of multiple physical namespaces according to an embodiment.

In a third use case, a logical namespace is assembled from concatenated extents of multiple physical namespaces. FIG. 8 is a diagram of a logical namespace assembled from concatenated extents of multiple physical namespaces according to an embodiment. In this example, Host H-1 604 accesses LN-A. DVM 616 has concatenated four 1 GB extents of three different PNs to form a 4 GB logical namespace LN-A. The extents are: 0-1 GB of PN-A in subsystem S-1 604, 2-3 GB of PN-B in subsystem S-2 704, 1-2 GB of PN-C in subsystem S-3 804, and 2-3 GB of PN-A in subsystem S-1 604.

This is the general DVM use case, where LNs are allocated fluidly from free regions of PNs. Here the PN extents are all the same size. A DVM 616 is free to allocate extents of any size. When adjacent extents of the LN are on the same subsystem, a single location hint spanning their LBA range can be used.

In this example, host H-1 602 contacts the DS 610, retrieves the list of subsystems, and connects to subsystems S-1 604, S-2 704, and S-3 804. As above the host H-1 discovers that these are all redirectors, and all provide LN-A. At that point host H-1 has three default targets for all I/O requests to all LBAs of LN-A. All are equally preferred because so far there have been no location hints expressing any priority of the alternatives. This example also uses location hints of the form described in Table 1. In this case they all refer to both reads and writes, and they all refer to the various 1 GB extents of LN-A.

In this example, each subsystem could send host H-1 initial hints about the extents each subsystem owns. Host H-1 would then have a complete map of LN-A at initialization and may never send an I/O request that gets forwarded. This technique should be sufficient for LNs with up to dozens or a hundred extents.

DVM 616 is responsible for maintaining the mapping of LN-A to component PN extents, and for initializing the mappers 628, 728, 828 in each subsystem with entries for the extents each subsystem owns. The DVM must also initialize the mappers 628, 728, 828 in each subsystem (e.g., S-1 604, S-2 704, and S-3 804) so I/O requests to any LBA can be completed by any of them. In FIG. 8, this is done by populating each mapper with a complete map of all four extents of LN-A.

If LN-A had been composed of a much larger number of extents, DVM 616 could have used different strategies to ensure all subsystems could complete all I/O requests. It still has to populate the mapper in each subsystem with entries for the LN-A extents each subsystem contains, but the DVM doesn't necessarily have to initialize every subsystem with a complete map of every LN.

In an embodiment, the DVM could construct a circular list of subsystems containing LN-A extents and make each subsystem the default target for the subsystem preceding it on the list. In this way no subsystem is ever initialized with the complete map. At startup some I/O request may traverse every subsystem in the list, but the second I/O request to any extent will take a much shorter path.

The DVM could have chosen one subsystem to contain a complete map of LN-A and make that the default target for all the other subsystems. If the complete map is too large for any single subsystem, the DVM could divide LN-A up into large regions and choose subsystems to each be initialized with compete maps of one of these large regions, then initialize all the other subsystems with hints directing these large regions to the subsystem with its complete map. A DVM could also create one or more subsystems with no actual PNs but with the capacity for large mapper tables. These mapping-only subsystems would be initialized with complete maps and be the default targets for other subsystems In various embodiments, all of these strategies enable a DVM to locate the managed mapper entries (which a redirector cannot discard) where there is space for them. Hosts don't necessarily have to be initialized to treat the subsystems with complete maps as their preferred defaults. They could be initialized to prefer any subsystem near them on the fabric and rely on that subsystem to forward I/O requests according to one of these map initialization strategies, then retain and pass back the resulting hints.

In a fourth use case, a logical namespace is mapped to an array of physical namespace extents, and stripes data across groups of the PNs. This example uses the same LN as above, backed by the same set of 1 GB PN extents. Instead of simply concatenating these extents (so that I/O request to the first 1 GB goes to the first extent, the second GB goes to the second extent, etc.) in this example, an embodiment stripes I/O request to the first 4 GB across the first four extents. This illustrates an algorithmic location hint.

Host H-1 602 accesses LN-A. DVM 616 concatenates four 1 GB extents of three different PNs to form a 4 GB logical namespace LN-A. The LN-A LBAs are divided into strips. An extent contains an integer number of strips. If the strip size is 1 MB, the first 1 MB of LN-A maps to the first 1 MB of the first extent of PN-A. The second 1 MB strip of LN-A maps to the first 1 MB of the $3^{rd}$ extent of PN-B, and so on. If there are E extents, then each set of E strips forms a stripe. The number of stripes is the same as the number of strips that fit in an extent. The set of extents containing the stripes is a stripe group. Table 2 below illustrates the concept of striping.

TABLE 2

| | Stripe group | | | |
|---|---|---|---|---|
| | PN-A extent 1 | PN-B extent 3 | PN-C extent 2 | PN-A extent 3 |
| LN-A stripe 1 | LN-A strip 1 | LN-A strip 2 | LN-A strip 3 | LN-A strip 4 |
| ... | | ... | | |
| LN-A stripe 1024 | LN-A strip 4093 | LN-A strip 4094 | LN-A strip 4095 | LN-A strip 4096 |

In this example, LN-A is formed from just one set of PN extents and is just 4 GB in size. Additional stripe groups can be concatenated to form a larger striped LN. Rather than managing and sending hints for each of the 4096 strips in the above stripe group, the DVM configures the redirectors near the PNs to send a striped location hint as shown in the example of Table 3.

TABLE 3

| Field | Description |
| --- | --- |
| LN Start LBA | Offset in LN of this stripe group |
| LN stripe size | Bytes per stripe (or stripe number bitmask) |
| Stripe extent count | PN extents per stripe group (or extent number bitmask) |
| Stripe group members | Array of length "Stripe extent count" |
| Extent 1 Subsystem NQN | One of the subsystems identified by the DS |
| Destination NSGUID | The same as the LN NSGUID |
| Offset | The same as 'Start LBA' |
| Extents 2-n | Repeats for as many extents as there are |

A single striped location hint in this example covers 4 GB of LN-A and specifies the location of 4096 1 MB regions. The DVM must ensure that striping hints do not overlap, and that the strips size and stripe extent count produce an integer number of strips per extent.

In a fifth use case, a logical namespace is mapped to extents located by a hash function. In this example, host H-1 602 accesses LN-A, which in an embodiment is persisted in a Ceph RBD volume. NVMe-oF access to LN-A is provided by a set of subsystems S-1 . . . S-n located in each of a Ceph cluster's OSD nodes. Ceph stores objects (named groups of 1-32M bytes) on a large number of block storage devices. A Ceph storage node typically contains many storage devices, and hosts the Object Storage Device (OSD) daemon for each. The block storage device plus the OSD process form the running OSD. The block device itself formatted with the OSD data is also sometimes called the OSD. Herein there are n Ceph storage nodes, and each one of them contains one of S-1 . . . S-n.

Ceph divides logical block devices into fixed size extents, and stores each in a Ceph object. Ceph objects are stored in a set of Ceph object storage devices (OSD). Ceph chooses the OSD for any object via a consistent hashing process. This process hashes the name of the object with a specific hash function and uses the n least significant bits of the hash as an index into a table of OSDs.

In this example, subsystems S-1 . . . S-n here are Reliable Autonomic Distributed Object Store (RADOS) block device (RBD) aware. These redirectors accept NVMe-oF IO requests, use the Ceph RBD library to determine which RBD object the I/O addresses, and either completes that IO to RBD (using the Ceph RBD library) or forwards the I/O request (via NVMe-oF) to the subsystem in the Ceph OSD node where that object resides. If the I/O request addresses an object on another OSD node (whether the IO was completed by forwarding it or not), a (simple) location hint is sent to the host for the LBA range corresponding to that object. While S-1 . . . S-n are all NVMe-oF gateways, they normally only handle the I/O request for RBD volume extents that are stored in objects local to themselves.

Unlike the redirectors near the PNs in the simpler DVM examples above, an RBD aware redirector can actually complete an I/O request to any region of any RBD volume. This means forwarding I/O requests to the correct destination via NVMe-oF as in the simple DVM examples is not required for these redirectors. If these redirectors don't forward non-local I/O request they must still send simple location hints for non-local I/O requests.

The Gluster distributed storage system uses a similar mechanism. These systems differ in the object naming and hash function details, but the same general mechanism of embodiments of the present invention can address both of them.

For this use case, a consistent hash location hint is introduced. This hint is delivered to hosts in their initial location hint set. Hosts that understand this hint should retain the hint for the lifetime of the connection. The consistent hashing hint shown below in Table 4. contains information sufficient for a host to identify the LBA bounds of the objects persisting the LN, generate that object's name, and determine which subsystem should contain that object. This hint refers to a table stored in another log page. For this example, assume that the table can contain an array of subsystem NQNs (one per hash bucket).

TABLE 4

| Field | Description |
| --- | --- |
| LN chunk size | Bytes per object |
| Chunk name format string | Leading and trailing portion of object name, and format specifier for the chunk number. |
| Hash function | Code for one of the pre-defined hash functions |
| Hash bucket count | Size of location table indexed by hash |
| Hash table log page | Log page containing the location table |

For Ceph backed LNs the role of the DVM is reduced. The DVM doesn't manage the mapping of the LN to a collection of PN extents. Instead the DVM persists the mapping of the LN to a Ceph volume. The DVM must identify all the RBD aware subsystems on Ceph OSD nodes that may contain pieces of the RBD volume. This will be all of the nodes with OSDs in the Ceph OSD pool in which the RBD volume was created (which may be a subset of all the OSDs in the cluster). The DVM must configure all of these subsystems with the mapping of LN-A to its backing RBD volume and configure DS 610 that host H-1 604 will consult with all these subsystems. Host H-1 then discovers and connects to all these subsystems as in the other examples.

In an embodiment, when host H-1 has I/O requests for LBA X of LN-A host H-1 applies this hashing hint by first determining which chunk X falls into (for example, X mod chunk_size). Host H-1 then produces the name of the chunk using the chunk number, the chunk name format string, and a function like printf. Host H-1 then hashes that string with the hash function identified in the hint. The hash value is truncated to match the hash bucket count, and finally used as an index into the hash table the Host H-1 has read from the hash table log page to find the subsystem responsible for this chunk.

Redirectors supporting the consistent hashing hint may cache the results of applying this hint. Applying a simple location hint (just a lookup by LBA of a target) is likely fast enough to be used in a special case "fast" I/O path. A redirector could perform this hash function in its slow path and produce a simple location hint for subsequent use in its fast path in the process.

In an embodiment, the hash table log page is an array of subsystem NQNs. In an embodiment, the size of the hash table may be approximately 2K-4K entries. NQNs are fairly large, and there may be far fewer unique subsystem NQNs than there are hash table buckets. In an embodiment, the hash table is a two-level table using two log pages. The first page will identify subsystems S-1 . . . S-N by NQN and specify a destination NSGUID. It will also include a 16-bit identifier. The second page will contain an array of the 16-bit subsystem (and translated namespace) identifiers defined in the first page. Both pages will begin with a 32-bit content generation number. In an embodiment, hosts reading these log pages will repeat the read until both log pages are seen to contain the same content generation.

The general parameters of a consistent hashing hint are unlikely to change, but the hash table may change after certain storage system configuration changes or failure recoveries. Subsystems may send the consistent hash hint again at these times. A host receiving an update to this hint must reread the hash table.

If the host finds that the hash table refers to a subsystem NQN not included in the list the host obtained from DS 610, the host must reread the discovery information from the DS to find the transport address and connection parameters for the new NQN. Hosts are free to drop connections to NQNs no longer appearing in the DS.

For both Ceph and Gluster, the consistent hash identifies where an object should be. Failures and configuration changes may result in objects being stored other than where they should be. This is generally a temporary condition which the storage system resolves by migrating objects over hours or days.

In an embodiment, simple location hints can be used in conjunction with the consistent hashing hints to accommodate these temporarily misplaced objects. RBD aware redirectors will already employ Ceph RBD library code to discover the actual location of the object addressed by any I/O request, even if the object isn't currently where the consistent hashing function says it should be. When redirectors locate these objects, the redirectors will send a simple location hint.

Any redirector receiving a simple location hint for a LN covered by a consistent hashing hint should consider the simple hint to take precedence over the results of the consistent hashing hint. If a simple location hint is received which agrees with the consistent hash, the simple location hint may be discarded. In an embodiment, the simple location hint is added to a fast path table and will expire naturally along with the ones generated locally from the hash function.

Note that any location hint may be retained, forwarded, and applied by any redirector in the path of an I/O request. This applies to simple and algorithmic hints. In embodiments, redirectors are included in the smart NICs of Ceph OSD nodes and used as default targets for NVMe-oF initiators that don't support location hinting, or don't support the hash function used for a particular volume. That smart NIC could apply the consistent hashing hint and forward traffic to the correct OSD node without passing it through to the RBD aware redirector in the local host. This would offload the majority of forwarding for all I/O requests arriving at the OSD node for objects not located there.

In an embodiment, specific methods for redirector discovery, and location hint transport may be used. In one embodiment, a log page is designated as a Location Hint Log Page. In an embodiment, this is a vendor specific log page starting at address 0xf0. Hosts will use an Asynchronous Event Request command for the Location Hints Log Page (or all vendor specific events) to obtain notifications that there are new location hints to read. Hosts can read the hints in the Location Hints Log Page with one or more Get Log Page commands. A Get Log Page command is sent by the host to Subsystems the host is connected to that provide logical namespaces the host is using. Hosts need to read the location hint log page from each subsystem. If they're using more than one LN, they'll have to do that for each LN. They need to repeat that for any subsystem+LN for which the availability of new location hints has been indicated (not necessarily all of them each time).

These Get Log Page commands must specify the NSID of the LN to which the location hints apply. The final Get Log Page command must have the Retain Asynchronous Event flag cleared. Clearing the asynchronous event signals the redirector that the current batch of location hints has been delivered.

Hosts will read the Location Hint Log Page on connection establishment to obtain any initial location hints the redirector has for it. Redirectors populate the Location Hints Log Page with the location hints most likely to apply to I/O requests from the associated host (such as largest scope, matching the most recent I/O request, etc.). Redirectors are free to change the contents of the Location Hint Log Page until the host reads the log. From the first host read until the log page is cleared the contents must remain unchanged. The page will read as empty once the redirector has sent all the hints it has for that host. Hosts should send Asynchronous Event Requests for this log page, which the redirector should complete, signaling an event, if there are any location hints available.

In one embodiment, the first two bytes of the Location Hint Log Page contain the format version, which is zero. The second two bytes contain the number of location hints in the page. The rest of the Location Hint Log Page is a series of location hints. Each location hint begins with a code (one byte) identifying its type (simple, stripe, or consistent hash) and length (one byte) in bytes. Hosts can ignore hints of types they do not understand and skip forward to the next one.

In one embodiment, redirectors contain a "white list" of controllers that include redirector capabilities. These will be identified by vendor ID (VID), subsystem vendor ID (SSVID), and model number (MN). When establishing connections to subsystems, a redirector compares an Identify Controller data structure to its white list. Wildcards (0) for VID and SSVID may be used. A regular expression can be specified to match the MN string. When host H-1 finds subsystem S-1 on the white list, host H-1 issues the Get Log Page command for the Location Hint Log Page. If subsystem S-1 fails this command with "invalid log page", subsystem S-1 is not a redirector.

In an embodiment, the Asynchronous Event Configuration NVMe feature is extended to define an "asynchronous location hint notification" capability. Hosts will issue the Get Features command for the Asynchronous Event Configuration feature with the "supported capabilities" selector. Subsystems with the async location hinting capability are redirectors. Host that enable this capability are redirectors.

Further, defined values to the Notice class of Asynchronous Event Information codes are added for Location Hints available (replacing the vendor specific async event type).

In an embodiment, a standard log page identifier is defined for the Location Hint Log Page (replacing vendor specific page starting at address 0xf0). Once these features and extensions are adopted, redirectors can dispense with the white list.

When an embodiment of the present invention is used to provide access to a Ceph RBD volume for host H-1 602, host H-1 connects to a redirector in every Ceph storage node. A single consistent hash location hint will be used to direct most I/O requests to the correct storage node. Some simple location hints may also be used to handle incorrectly located objects.

When using a hashed hint for an RBD volume, host H-1 602 is initialized as follows. First, the redirector in host H-1 starts. Host H-1 determines which discovery service the host will use in the same way that NVMe-oF does now (e.g., by manual configuration, or DNS query). Host H-1 consults discovery service DS-1 610 and finds available subsystems S-1 . . . S-3. Host H-1 connects to controllers in subsystems S-1 . . . S-3 and finds namespace LN-A is provided by all of them. Host H-1 reads the location hint log page from each subsystem the host connects to. Since this is an RBD volume, the set of location hints from all of the subsystems will contain the same consistent hash location hint which applies to the entire LBA range of LN-A. There may also be simple location hints in these tables, which will override the hash function for various small LBA ranges of LN-A. Host H-1 incorporates all of these hints into the host's initial hint table. Duplicates (hints covering identical LBA ranges) are discarded. Host H-1 is now ready to accept I/O requests.

Figure 9:
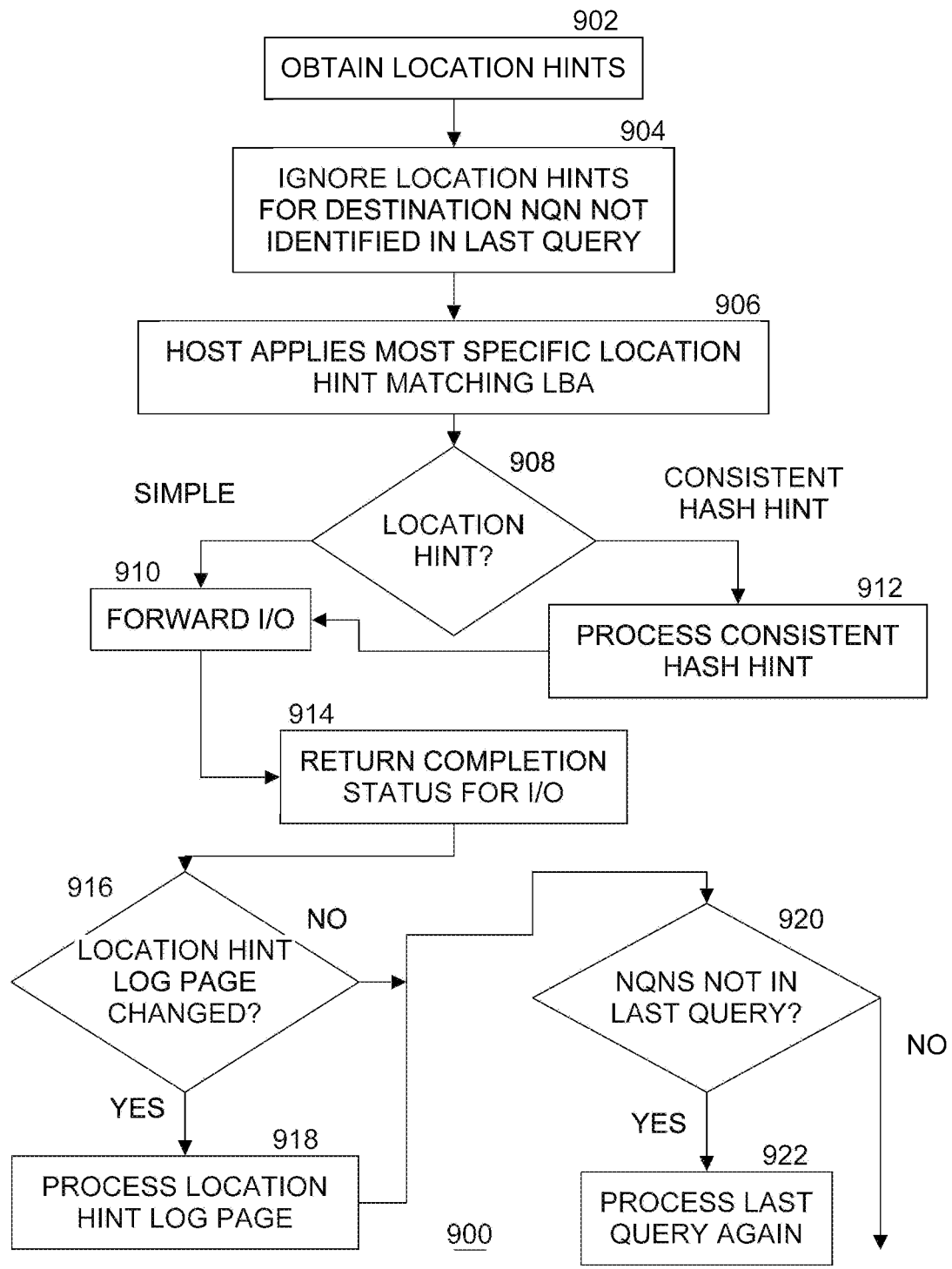
FIG. 9 is an example flow diagram of host processing using a hashed hint for an RBD volume.

FIG. 9 is an example flow diagram of host processing using a hashed hint for an RBD volume. For each I/O request submitted to redirector host H-1 602 (e.g., via a local NVMe interface), a redirector device within host H-1 performs the following actions. At block 902, Host H-1 obtains the location hints that apply to the LBA range of the I/O request (striped location hints aren't used in the RBD case, so handling of them will not be described here). At block 904, location hints specifying a destination NQN not identified in the last (i.e., immediately preceding) discovery service 610 query are ignored. I/O requests matching these hints will be redirected to the next best hint until discovery service 610 supplies the information necessary for host H-1 602 to establish a connection to the new NQN. At block 906, for each LBA in the I/O request, host H-1 602 applies the most specific location hint that matches that LBA to identify a destination for the I/O request. If all of the LBAs in the submitted I/O request don't match the same location hint, the submitted I/O request is split and portions of the I/O request are redirected to different places. In a correctly configured system this should never happen, so this case can be handled in the slow I/O request path.

For each LBA (or contiguous group matching the same hint), host H-1 602 checks the location hint at block 908. If the most specific matching location hint is simple, the I/O request is forwarded to that destination (e.g., the destination indicated in the simple location hint) at block 910. When the forwarded I/O request completes to the destination, the redirector returns that completion status for the submitted I/O request at block 914. If the submitted I/O request was split across multiple destinations, the submitted I/O request completes when all forwarded portions complete. If any forwarded portions fail, the completion status of the submitted I/O request has the failure code for the first portion that failed.

If the matching location hint is a consistent hash hint, host H-1 602 processes the consistent hash hint at block 912 by performing the following actions. Host H-1 602 determines which chunk in the storage subsystem is referenced by the LBA (using the chunk size in the consistent hash hint); generates the name of the chunk (using the name components in the consistent hash hint); applies the hash function identified in the consistent hash hint to the chunk name to produce a chunk name hash value; truncates (e.g., using a mod operation) the chunk name hash value to match a bucket count in the consistent hash hint; and reads the entry in a hash table log page corresponding to the truncated chunk name hash value. Host H-1 602 then redirects the I/O request to the storage subsystem identified by the truncated chunk name hash value. If that storage subsystem hasn't been identified in a discovery service query yet, the host selects any other storage subsystem that advertises this LN and repeats the discovery service query if the query isn't already in progress. Host H-1 602 inserts this result in the host's local hint table as a simple location hint, to speed forwarding the next I/O request to this same chunk. Processing continues with block 910.

In embodiments of the present invention, a local hint table is updated to include the best-known location for as many of the LBAs of a LN as possible. The locations are received from all of the possible forwarding destinations. If a new hint is received, the new hint is added. If a received hint has already been seen, but the received is different than what was previously stored, then the existing hint is replaced with the new updated hint. When a consistent hash hint is used, simple hints may be received for small regions of the volume. If the simple hints specify a destination that's different from the one identified from the hash hint, the simple hint is added to the log table, and is used to override the location indicated by the hash function. When a simple hint is received that agrees with the current hash hint, this means that the hash hint is now correct for that LBA region and any simple hint that overrides current hash hint is removed from the log table.

If an async event indicates the location hint log page has changed at block 916 (or the configured I/O count or time limit has expired), host H-1 602 processes the location hint log page at block 918, as follows. If the hint is not already in the local hint table, the hint is added to a local hint table. If the hint, including the consistent hash hint, refers to the same LBA range as an existing hint and has a different destination (or different parameters, including the contents of any supporting log pages), the host replaces the existing hint with the new hint in the local hint table. If the consistent hash hint is replaced, the host discards any simple location hints that were generated locally from the existing hint. If a simple location hint specifies a destination that matches what the current consistent hash hint produces, the host adds a locally generated hint for this region to its hint table, replacing any matching simple location hints already present.

Finally, at block 920, if any new hints refer to subsystem NQNs not listed in the last (i.e., immediately preceding) discovery service 610 query, the host repeats processing of the last query at block 922.

Hosts are redirectors, but they are not NVMe-oF subsystems. Since hosts are not subsystems, hosts cannot accept connections from NVMe-oF hosts, so they never need to forward I/O requests for another host or send location hints.

Embodiments of the present invention handle use cases with distributed volume managers. These use cases will not use consistent hashing hints but might use striped location hints. Initialization is the same as for the hashed hint case above, except that initial hints won't include any consistent hash hints. For I/O request processing, the per I/O request flow is the same as the hashed hint case, except all LBAs will match simple location hints or striped location hints.

Figure 10:
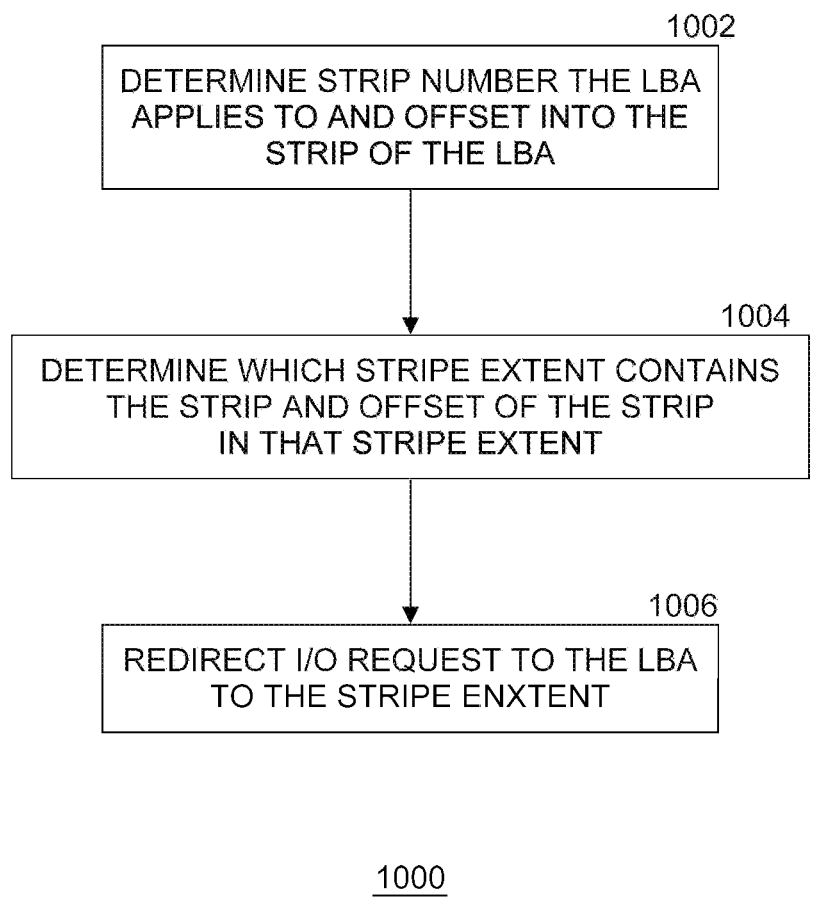
FIG. 10 is an example flow diagram of host processing without using a hashed hint for a general case.

FIG. 10 is an example flow diagram of host processing without using a hashed hint for a general case. In an embodiment, these steps are performed between block 908 of FIG. 9 (where the type of the matching location hint is determined) and block 910 (where the I/O is forwarded). For LBAs matching a striped location hint, a redirector device within host H-1 602 performs the following actions. At block 1002, the host determines the strip number the LBA applies to (using the LN stripe size and stripe extent count in the hint), and the offset into the stripe of this LBA. At block 1004, the host determines which stripe extent contains this strip, and the offset of the strip in that stripe extent (using the stripe extent count and stripe group members in the hint). At block 1004, the host redirects I/O requests to this LBA to the stripe extent identified above, translating the LBA number to the stripe extent offset (from the hint), plus the offset of this strip in the stripe extent (as computed above), plus the offset of this LBA in this strip (as computed above).

As mentioned earlier, the submitted I/O request must be split if all of LBAs of the I/O request don't match the same location hint. The submitted I/O request must also be split if the I/O request matches a striped location hint but not all of the I/O request's LBAs map to the same strip. The system should be configured so this does not occur, so again this case can be handled in the slow path.

Let's turn now to I/O request processing at the last hop (e.g., subsystem) for a general case. The LN is managed by DVM 616. DVM 616 will configure subsystems S-1 604 . . . S-3 804 with authoritative locations for all of the extents of the LNs they contain, and default forwarding rules that ensure subsystems S-1 604 . . . S-3 804 can all complete I/O requests to any LBA (by forwarding I/O requests to extents they don't have to subsystems that do).

For initialization processing for the last hop for a general case, subsystem S-1 604 performs the following actions. The last hop redirector in subsystem S-1 604 starts. Subsystem S-1 604 consults local configuration information to determine which local storage devices the subsystem will use to contain portions of logical namespaces. Subsystem S-1 604 communicates with DVM 616 to obtain: a) the list of LNs that subsystem S-1 provides; b) the extents of each LN that subsystem S-1 contains, the extent size, which local device contains the extents, and the offset into the device of that extent; and (optionally) c) discovery service 610 should consult (which could be different from the DS the hosts use), and/or the set of subsystems the discovery service would reveal. If the DVM hasn't specified a discovery service, subsystem S-1 determines which discovery server the subsystem will use in the same way NVMe-oF does now (e.g., manual configuration, or DNS query). Subsystem S-1 consults discovery service DS-1 610 and discovers subsystems S-1 604 . . . S-3 804. Subsystem S-1 connects to controllers in subsystems S-1 . . . S-3 (excluding itself) and finds they all provide LN-A. Subsystem S-1 then reads the location hint log page from each subsystem that subsystem S-1 connects to. Subsystem S-1 incorporates all of these hints into S-1's initial hint table (discarding duplicates). Subsystem S-1 604 is now ready to accept I/O requests. Similar initialization processing is performed for other subsystems.

An incoming connection from another host/redirector is processed by subsystem S-1 604 as follows. Subsystem S-1 604 establishes or rejects a NVMe-oF connection from a host H-x and controller association for host H-x as per the NVMe-oF Specification. If the host reads the location hint log page for LN-A, then subsystem S-1 will treat host H-x as a redirector and will prepare the initial location hint log page contents, including as many location hints for LN-A extents located in subsystem S-1 as will fit.

Figure 11:
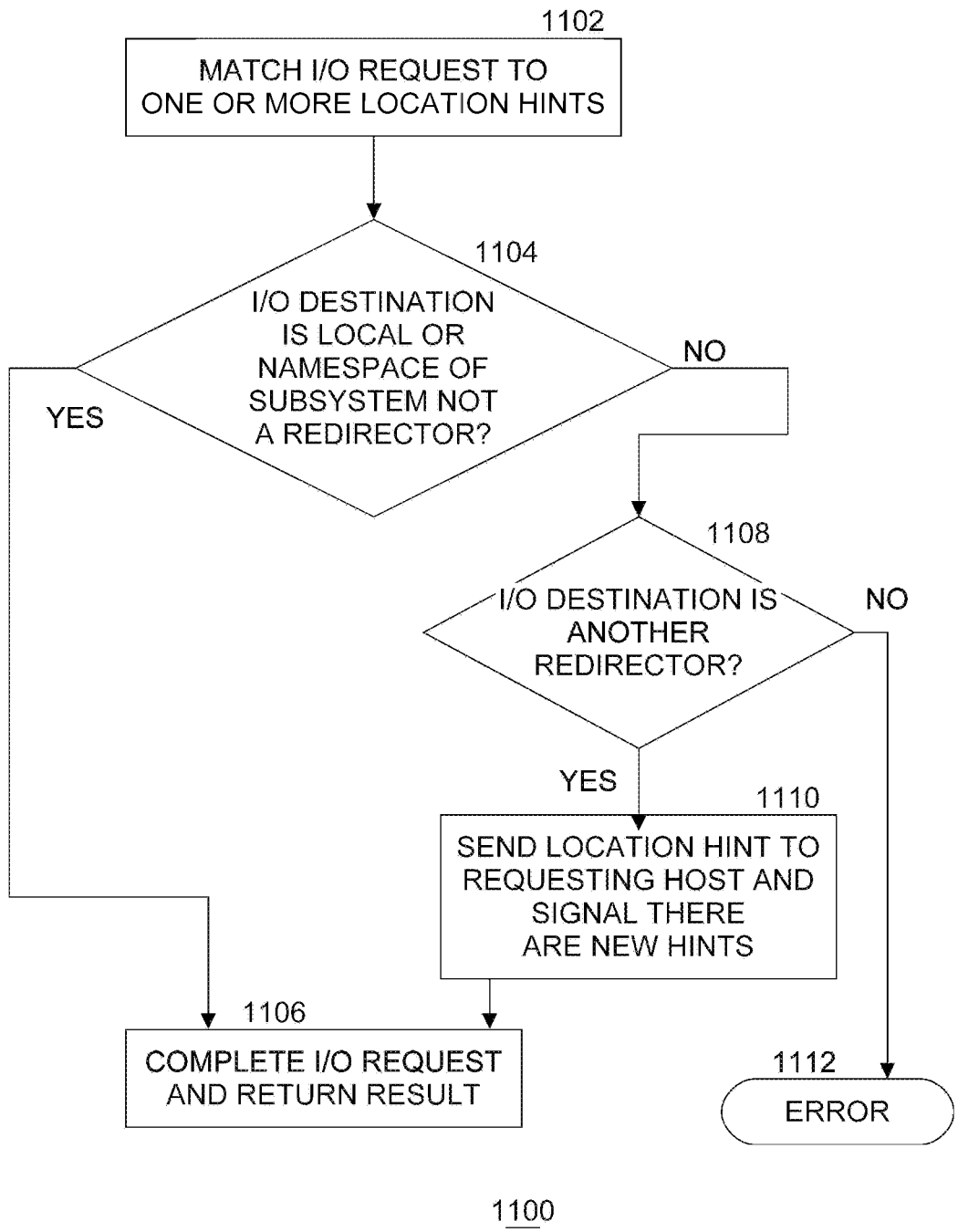
FIG. 11 is an example flow diagram of I/O processing at the last hop for a general case.

FIG. 11 is an example flow diagram of I/O processing at the last hop (subsystem) for a general case. For each I/O request arriving at subsystem S-1 604 (for example), the following actions are performed. At block 1102, subsystem S-1 604 matches the I/O request to one or more location hints as in the above cases. I/O request splitting may also be required here but should also not occur under normal circumstances. At block 1104, if the I/O destination is a local storage device or a namespace of a NVMe-oF subsystem that is not a redirector (i.e., doesn't have a location hint log page), subsystem S-1 604 completes the I/O request at block 1106 (applying the appropriate LBA translation as in the host redirector cases above) and returns the result of I/O to the host sender of the incoming IO request. If the I/O destination is not a local storage device or a namespace of a subsystem that is not a redirector, then processing continues with block 1108. At block 1108, if the I/O destination is another redirector, subsystem S-1 604 sends, at block 1110, the location hint used to make the forwarding decision to the requesting host (if the location hint isn't already in the current contents of the location hint log page) and signals the requesting host that there are new hints. Subsystem S-1 604 then completes the I/O request and returns the result as in the non-redirector case at block 1106. If the I/O destination is neither a local storage device nor another redirector, then an error has occurred at block 1112.

Each time the location hint log page is read by subsystem S-1 604, the subsystem performs the following actions. First, subsystem S-1 604 starts a new location hint log page and adds all new location hints to the new location hint log page. When the host finishes reading the current location hint log page, subsystem S-1 604 discards the contents and replaces it with the new location hint log page. Subsystem S-1 604 adds new hints to the current log page until the host starts reading the current log page again.

Each time location hints arrive from connected redirectors subsystem S-1 604 incorporates the new location hints into the local hint table as in the general host case (including discovery service query repeat when the hint refers to an unknown NQN). If the new hint changes the local hint table, subsystem S-1 604 passes the new hint on to all connected redirectors (hosts or other last hop or intermediate redirectors) that have attached to that logical namespace.

Let's turn now to I/O request processing at the last hop (e.g., subsystem) for the RBD volume case. In this use case, the LN is a Ceph RBD volume. The distributed volume manager (DVM) here configures the discovery service (DS) that host H-1 602 will use to discover the NVMe-oF subsystems to connect to (one in each Ceph object storage device (OSD) node) and configures the RBD-aware redirector in each Ceph OSD node to associate LN-A with a user-specified RBD volume. Unlike in the general last hop redirector case, an RBD aware redirector can complete I/O requests to any LBA of the volume. Completing non-local LBAs is suboptimal but produces a correct result. In an embodiment, an RBD aware redirector could include the parts of the general last hop redirector needed to forward non-local I/O requests via NVMe-oF.

For initialization processing for the last hop for the RBD volume case, subsystem S-1 604 performs the following actions. The last hop redirector in subsystem S-1 starts up. Subsystem S-1 communicates with the DVM 616 to obtain: a) the list of LNs subsystem S-1 provides; b) the RBD volume corresponding to each LN; and c) the log pages to use for the hash table and subsystem NQN table. Next, subsystem S-1 opens the RBD volume. Subsystem S-1 generates the consistent hash location hint and supporting log pages. The LN chunk size is the object size for the RBD volume. The chunk name format string is derived from the RBD volumes identifier (ID) and the Ceph RBD object naming algorithm. The hash function is set to the ID for Ceph RBD. Subsystem S-1 sets the hash table and subsystem NQN table log pages in the hint. Subsystem S-1 enumerates the Ceph OSD nodes and adds an entry for the redirector in each to the hint's subsystem NQN table (using the same rule the subsystem used to create its own NQN). Subsystem S-1 enumerates the RADOS hash table buckets (which identify specific OSDs to contain objects that hash to that bucket) applicable to the configured RBD volume and fills out the corresponding hash table log page bucket with the index into the hint's subsystem NQN table of the Ceph OSD node that contains the OSD identified in the RADOS hash table. S-1 is now ready to accept I/O requests.

Whenever the Ceph cluster map changes (e.g., something is added or removed from the Ceph cluster), subsystem S-1 repeats the consistent hash location hint generation detailed above in initialization. This includes the hash table and subsystem NQN tables. The updated hint (if it is different) is passed to all connected hosts, which will replace their prior consistent hash hints.

An incoming connection from another host/redirector is processed by subsystem S-1 604 as follows. Subsystem S-1 establishes or rejects a NVMe-oF connection from a host H-x and controller association for Host H-x as per the NVMe-oF Specification. If the host reads the location hint log page for LN-A, subsystem S-1 will treat host H-x as a redirector and subsystem S-1 will prepare the initial location hint log page contents with the most recent consistent hash location hint.

Figure 12:
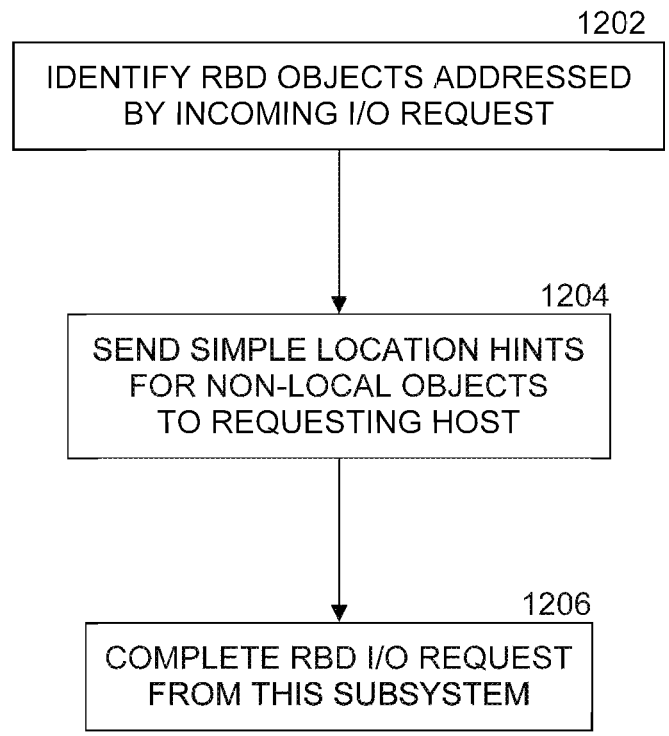
FIG. 12 is an example flow diagram of I/O processing at the last hop for an RBD volume.

FIG. 12 is an example flow diagram of I/O processing at the last hop for an RBD volume. For each incoming I/O request arriving at subsystem S-1 604 the following actions are performed. At block 1202, subsystem S-1 604 identifies the RBD objects the incoming I/O request will address. Next, at block 1204 subsystem S-1 sends simple location hints for the non-local objects to the requesting host. At block 1206, subsystem S-1 completes the RBD I/O request from this subsystem, letting a "librbd" function do any necessary splitting across objects in an embodiment. The location hint log page reading is handled the same as in the general last hop case and is also applied to the hash table log pages.

Let's turn now to I/O request processing for an intermediate hop (e.g., subsystem). Embodiments of the present invention may be configured with redirectors between the initiating hosts and the storage nodes (e.g., subsystems). In the third use case described above, additional redirectors (N-1) could be inserted between host H-1 602 and subsystems S-1 604 . . . S-3 804. Host H-1 602 would discover (from discovery service DS-1 610) subsystems N-1 and S-1 . . . S-3. DVM 616 would configure all of these subsystems to make redirector subsystem N-1 the default target for host H-1. Subsystems S-1 . . . S-3 may send no initial hints to host H-1 on connection in this case and rely on host N-1 to send hints. Apart from that action, the initialization and per-I/O request operations are the same as the general last hop case.

For initialization processing for an intermediate hop, subsystem S-1 604 performs the following actions. The intermediate redirector in subsystem N-1 starts up. Subsystem N-1 (optionally) communicates with the DVM 616 to obtain: a) the list of LNs subsystem N-1 provides; and b) optionally the discovery service that subsystem N-1 should consult and/or the set of subsystems the discovery service would reveal to subsystem N-1. If there is no DVM, subsystem N-1 assumes that subsystem N-1 provides every LN provided by every subsystem revealed to it by discovery service 610. If the DVM 616 hasn't specified a DS 610, subsystem N-1 determines which discovery server subsystem N-1 will use the same way as the NVMe-oF does now (e.g., manual configuration, or DNS query). Subsystem N-1 consults discovery service 610 and finds subsystems S-1 604 . . . S-3 804. Subsystem N-1 connects to controllers in subsystems S-1 604 . . . S-3 804 and finds they all provide LN-A. Subsystem N-1 reads the location hint log page from each subsystem it connects to. Subsystem N-1 incorporates all of these hints into subsystem N-1's initial hint table (discarding duplicates). Subsystem N-1 is now ready to accept I/O requests.

An incoming connection from another host/redirector is processed by subsystem N-1 as follows. Subsystem N-1 establishes or rejects a NVMe-oF connection from a host H-x and controller association for Host H-x as per the NVMe-oF Specification. If the host reads the location hint log page for LN-A, subsystem N-1 will treat host H-x as a redirector and subsystem N-1 will prepare the initial location hint log page contents, choosing the hints from subsystem N-1's table that are likely to send the most I/O requests directly to their correct destinations (e.g., the set that matches the most LBAs).

Figure 13:
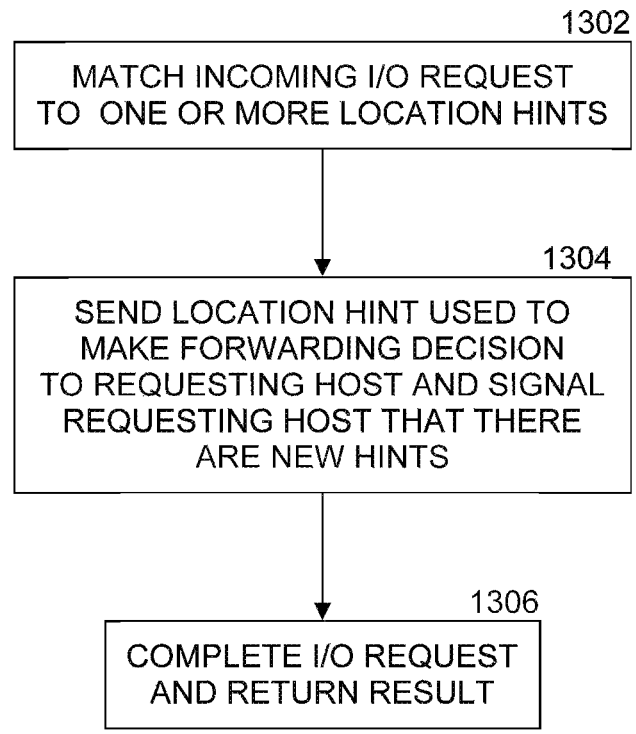
FIG. 13 is an example flow diagram of I/O processing at intermediate hops.

FIG. 13 is an example flow diagram of I/O processing at intermediate hops. For each incoming I/O request arriving at subsystem N-1 the following actions are performed. At block 1302, subsystem N-1 matches the incoming I/O request to one or more location hints as in the above cases. I/O request splitting may be required. This is an intermediate redirector, so the I/O destination will be another redirector. At block 1304, Subsystem N-1 sends the location hint used to make the forwarding decision to the requesting host (if the location hint isn't already in the current contents of the location hint log page) and signals the requesting host that there are new hints. Subsystem N-1 then completes the I/O request at block 1306 and returns the result.

Each time the location hint page is read, subsystem N-1 handles the read as in the general last hop case.

Each time location hints arrive from connected redirectors, subsystem N-1 handles the hints as in the general last hop case. Additionally, if the hint is a consistent hash hint, subsystem N-1 incorporates the new hint into the local hint table and re-reads the supporting log pages before passing the hint on to connected redirectors (if the hint actually changed).

Embodiments of the present invention enable NVMe-oF distributed storage solutions to be implemented without the significant overhead and constraints of a traditional storage array, and with minimal or no support in the hosts. The control plane components (e.g., the DVM) can now be remote from the storage devices. I/O requests can flow directly to storage devices in widely separated enclosures (rather than being forced to traverse one of the controllers in a storage array). The present system can scale much larger than existing approaches because the systems are free of the constraints of connectivity, bandwidth, device port count, etc., that storage arrays have.

Embodiments makes some NIC offloads easy to do and beneficial. Specifically, the offload in the host NIC that presents a hardware NVMe interface to the host, and the offload in the storage server NIC that avoids traversing the storage server's PCIe bus for forwarded I/O requests. In an embodiment, the redirector for NVMe-oF is implemented in a gate array or the processor embedded in a NIC.

Embodiments enable Ceph RBD volumes to be presented to hosts as hardware NVMe devices (or software if the NIC doesn't support Ceph RBD volumes but the host OS does). This removes the CPU overhead (for example, potentially several CPU cores) of the Ceph RBD client from the host. This administratively isolates the host from the Ceph cluster (i.e., the host doesn't need to be authorized to communicate with Ceph services). Embodiments remove the CPU overhead and management complexity of running a Ceph client in the smart NIC. Embodiments also eliminate the need for a fleet of storage gateway machines (which is the existing Ceph solution for RBD via iSCSI), and the associated overhead of the additional network hop through those gateways.

In embodiments of the present invention, this is accomplished with the consistent hash location hint. The result of these hints combined is that the enhanced NVMe-oF initiator in the host (or its NIC) will send I/O requests via NVMe-oF directly to the correct Ceph storage node (in one hop). The NVMe-oF to Ceph RBD gateway function is spread across all the Ceph storage nodes, and each of them handles NVMe-oF I/O requests only for their local OSDs. Thus, embodiments provide the low complexity, low overhead, and hardware offload friendly characteristics of NVMe-oF. A further advantage is the low network overhead (single hop to the correct storage node) characteristic of a native Ceph RBD client.

Without the consistent hash hint, the present system would need to use simple location hints to identify the location of each object containing a chunk of the RBD volume. However, there may be millions of objects backing a large RBD volume, which would require redirectors to retain an unreasonable number of hints. The first I/O request to any chunk would be sent to the wrong storage node almost every time. With the consistent hash hint, embodiments of the present invention almost always get the correct location for every chunk.

In embodiments, components (RBD aware redirectors) in Ceph storage nodes generate consistent hash location hints for the RBD volumes that will be accessed via NVMe-oF. This distills the cluster's data location mechanism into a simple rule that cheaper and less complex components (e.g., embedded redirectors) in the rest of the system can use to direct most I/O requests to the right place the first time (and thereafter to the right place every time).

Hosts submits I/O requests to what appears to be a hardware NVMe or native OS NVMe-oF device but is actually a redirector. The redirector matches the I/O request (by LBA and direction) to one or more of the redirector's accumulated location hints. The hints will identify the best-known destination for I/O requests to those LBAs. The best applicable location hint may take the form of a hash function, which the redirector uses to compute the best destination for the submitted I/O request. Unless there has recently been a failure or a configuration change in the Ceph cluster, that will nearly always produce the correct location. The redirector forwards the I/O request to the best-known destination and returns that completion status when the forwarded I/O request completes. The redirector may receive new or updated location hints from the destination, which the redirector will use for subsequent I/O requests. This may direct I/O request to the group of LBAs surrounding the last forwarded I/O request to a better destination. Location hints identify redirectors closer to the destination of the I/O. As I/O requests to suboptimal destinations produce hints for better locations, the set of hints in a host increasingly identifies the best destination for any I/O. The best destination for any I/O is always the redirector directly connected to it. In the case of RBD aware redirectors, all of them are directly attached to the entire RBD volume and can complete I/O requests for any LBA of that volume. A goal here is to place one of these in each Ceph OSD node, and only send the node I/O requests for objects on local OSDs by using the consistent hash location hint. I/O requests for any LBA arriving at an RBD aware redirector can be completed by that redirector (which is also a Ceph RBD client). If the I/O request corresponds to a non-local object, this redirector sends a simple location hint back to the source of this I/O request which will direct subsequent IO for the LBAs in that object to the correct RBD aware redirector (the one in the same node as the OSD containing the object).

It should be appreciated that the exemplary computing platforms shown in the Figures may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   obtaining one or more location hints applicable to a range of logical block addresses of a received input/output (I/O) request for a storage subsystem coupled with a host system over a non-volatile memory express over fabric (NVMe-oF) interconnect;
   for each logical block address in the I/O request:
      applying a most specific location hint of the one or more location hints that matches that logical block address to identify a destination in the storage subsystem for the I/O request;
      when the most specific location hint is a consistent hash hint, processing the consistent hash hint;
      forwarding the I/O request to the destination and returning a completion status for the I/O request;
   when a location hint log page has changed, processing the location hint log page; and
   when any location hint refers to NVMe-oF qualified names not included in an immediately preceding query by a discovery service, processing the immediately preceding query again.

2. The method of claim 1, wherein processing the consistent hash hint comprises:
   determining a chunk of the storage subsystem referenced by the logical block address;
   generating a name of the chunk;
   applying a hash function to the chunk name to produce a chunk name hash value;
   truncating the chunk name hash value to match a bucket count in the consistent hash hint;
   reading an entry in a hash table log page corresponding to the truncated chunk name hash value; and
   redirecting the I/O request to the storage subsystem identified by the truncated chunk name hash value.

3. The method of claim 2, comprising inserting a locally generated simple location hint in a local hint table of the host system.

4. The method of claim 1, wherein processing the location hint log page comprises:
   if the location hint is new, adding the new location hint to a local hint table of the host system;
   if the location hint refers to a same range of logical block addresses as an existing hint in the local hint table and has a different destination, replacing the existing hint with the new location hint;
   if a replaced location hint is a consistent hash hint, discarding any simple location hints that were generated local to the host system from the existing hint; and
   if a simple location hint specifies a destination that matches what processing of the consistent hash hint produces, adding a locally generated simple location hint for the LBA region which replaces any matching simple location hints in the local hint table.

5. The method of claim 4, comprising initializing the host system prior to receiving the I/O request by
   determining a discovery service to be used by the host system;
   consulting the discovery service to find available storage subsystems;
   connecting to controllers in the available storage subsystems and finding one or more namespaces for each available storage subsystem; and
   processing the location hint log page from each connected storage subsystem.

6. The method of claim 1, comprising ignoring one or more of the location hints for destination NVMe-oF qualified names not identified in an immediately preceding query by a discovery service and repeating the immediately preceding query.

7. The method of claim 1, comprising, when the location hint is a striped hint,
   determining a stripe number the logical block address applies to and an offset into a stripe of the logical block address;
   determining which stripe extent contains the stripe and offset of the stripe in the stripe extent; and
   redirecting I/O requests to the logical block address to the stripe extent.

8. The method of claim 1, comprising
   creating the consistent hash location hint from a storage cluster state;
   mapping hash table buckets to cluster nodes;
   populating an NVMe-oF discovery service with connection information for storage subsystems in cluster nodes;
   updating the consistent hash location hint whenever a cluster configuration changes; and
   for each I/O request:
     identifying objects addressed by an incoming I/O request;
     sending simple location hints for non-local objects to a requesting host; and
     completing the I/O request by the storage subsystem.

9. A non-transitory machine-readable storage medium comprising a plurality of instructions stored thereon that, in response to being executed, cause a host system to:
   obtain one or more location hints applicable to a range of logical block addresses of a received input/output (I/O) request for a storage subsystem coupled with the host system over a non-volatile memory express over fabric (NVMe-oF) interconnect;
   for each logical block address in the I/O request:
     apply a most specific location hint of the one or more location hints that matches that logical block address to identify a destination in the storage subsystem for the I/O request;
     when the most specific location hint is a consistent hash hint, process the consistent hash hint;
     forward the I/O request to the destination and return a completion status for the I/O request;
   when a location hint log page has changed, process the location hint log page; and
   when any location hint refers to NVMe-oF qualified names not included in an immediately preceding query by a discovery service, process the immediately preceding query again.

10. The non-transitory machine-readable storage medium of claim 9, wherein instructions to process the consistent hash hint comprise instructions to:
    determine a chunk of the storage subsystem referenced by the logical block address;
    generate a name of the chunk;
    apply a hash function to the chunk name to produce a chunk name hash value;
    truncate the chunk name hash value to match a bucket count in the consistent hash hint;
    read an entry in a hash table log page corresponding to the truncated chunk name hash value; and
    redirect the I/O request to the storage subsystem identified by the truncated chunk name hash value.

11. The non-transitory machine-readable storage medium of claim 9, wherein instructions to process the location hint log page comprise instructions to:
    if the location hint is new, add the new location hint to a local hint table of the host system;
    if the location hint refers to a same range of logical block addresses as an existing hint in the local hint table and has a different destination, replace the existing hint with the new location hint;
    if a replaced location hint is a consistent hash hint, discard any simple location hints that were generated local to the host system from the existing hint; and
    if a simple location hint specifies a destination that matches what processing of the consistent hash hint produces, add a locally generated simple location hint for the LBA region which replaces any matching simple location hints in the local hint table.

12. The non-transitory machine-readable storage medium of claim 11, comprising instructions to initialize the host system prior to receiving the I/O request by
    determining a discovery service to be used by the host system;
    consulting the discovery service to find available storage subsystems;
    connecting to controllers in the available storage subsystems and finding one or more namespaces for each available storage subsystem; and
    processing the location hint log page from each connected storage subsystem.

13. The non-transitory machine-readable storage medium of claim 9, comprising instructions, when the location hint is a striped hint, to
    determine a stripe number the logical block address applies to and an offset into a stripe of the logical block address;
    determine which stripe extent contains the stripe and offset of the stripe in the stripe extent; and
    redirect I/O requests to the logical block address to the stripe extent.

14. The non-transitory machine-readable storage medium of claim 9, comprising instructions to
    create the consistent hash location hint from a storage cluster state;
    map hash table buckets to cluster nodes;
    populate an NVMe-oF discovery service with connection information for storage subsystems in cluster nodes;
    update the consistent hash location hint whenever a cluster configuration changes; and
    for each I/O request:
      identify objects addressed by an incoming I/O request;
      send simple location hints for non-local objects to a requesting host; and
      complete the I/O request by the storage subsystem.

15. A system comprising:
    a storage subsystem;
    a non-volatile memory express over fabric (NVMe-oF) interconnect; and
    a host system coupled to the storage subsystem over the NVMe-oF interconnect, the host system to obtain one or more location hints applicable to a range of logical block addresses of a received input/output (I/O) request for the storage subsystem; for each logical block address in the I/O request:
      apply a most specific location hint of the one or more location hints that matches that logical block address to identify a destination in the storage subsystem for the I/O request;
      when the most specific location hint is a consistent hash hint, process the consistent hash hint;

forward the I/O request to the destination and return a completion status for the I/O request;

when a location hint log page has changed, process the location hint log page; and when any location hint refers to NVMe-oF qualified names not included in an immediately preceding query by a discovery service, process the immediately preceding query again.

16. The system of claim 15, wherein the host system processes the consistent hash hint by determining a chunk of the storage subsystem referenced by the logical block address, generating a name of the chunk, applying a hash function to the chunk name to produce a chunk name hash value, truncating the chunk name hash value to match a bucket count in the consistent hash hint, reading an entry in a hash table log page corresponding to the truncated chunk name hash value, and redirecting the I/O request to the storage subsystem identified by the truncated chunk name hash value.

17. The system of claim 15, wherein the host system processes the location hint log page by if the location hint is new, adding the new location hint to a local hint table of the host system; if the location hint refers to a same range of logical block addresses as an existing hint in the local hint table and has a different destination, replacing the existing hint with the new location hint; if a replaced location hint is a consistent hash hint, discarding any simple location hints that were generated local to the host system from the existing hint; and if a simple location hint specifies a destination that matches what processing of the consistent hash hint produces, adding a locally generated simple location hint for the LBA region which replaces any matching simple location hints in the local hint table.

18. The system of claim 17, wherein the host system is initialized prior to receiving the I/O request by determining a discovery service to be used by the host system, consulting the discovery service to find available storage subsystems, connecting to controllers in the available storage subsystems and finding one or more namespaces for each available storage subsystem, and processing the location hint log page from each connected storage subsystem.

19. The system of claim 15, wherein the host system, when the location hint is a striped hint, determines a stripe number the logical block address applies to and an offset into a stripe of the logical block address, determines which stripe extent contains the stripe and offset of the stripe in the stripe extent, and redirects I/O requests to the logical block address to the stripe extent.

20. The system of claim 15, wherein the host system creates the consistent hash location hint from a storage cluster state, maps hash table buckets to cluster nodes, populates an NVMe-oF discovery service with connection information for storage subsystems in cluster nodes, updates the consistent hash location hint whenever a cluster configuration changes, and for each I/O request: identifies objects addressed by an incoming I/O request, sends simple location hints for non-local objects to a requesting host, and completes the I/O request by the storage subsystem.

* * * * *